United States Patent
Amin et al.

(10) Patent No.: US 10,417,673 B2
(45) Date of Patent: *Sep. 17, 2019

(54) PROVIDING ON-DEMAND SERVICES THROUGH USE OF PORTABLE COMPUTING DEVICES

(71) Applicant: Uber Technologies, Inc., San Francisco, CA (US)

(72) Inventors: Shalin Amin, San Francisco, CA (US); Mina Radhakrishnan, San Francisco, CA (US); Paul-Phillip Holden, San Francisco, CA (US); Curtis Chambers, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/924,705

(22) Filed: Oct. 27, 2015

(65) Prior Publication Data

US 2016/0225051 A1    Aug. 4, 2016

Related U.S. Application Data

(63) Continuation of application No. 13/672,634, filed on Nov. 8, 2012, now Pat. No. 9,230,292.

(51) Int. Cl.
*G06F 3/0484* (2013.01)
*G06Q 30/02* (2012.01)
(Continued)

(52) U.S. Cl.
CPC ....... *G06Q 30/0284* (2013.01); *G06F 3/0484* (2013.01); *G06Q 20/10* (2013.01);
(Continued)

(58) Field of Classification Search
CPC .................................................. G06F 3/0484
See application file for complete search history.

(56) References Cited

U.S. PATENT DOCUMENTS

| 3,953,720 A | 4/1976 | Kelch |
| 5,043,736 A | 8/1991 | Darnell |
(Continued)

FOREIGN PATENT DOCUMENTS

| CN | 102402852 | 4/2012 |
| CN | 102496265 | 6/2012 |
(Continued)

OTHER PUBLICATIONS

International Search Report and Written Opinion, International Application No. PCT/US2010/059152, dated Mar. 28, 2011, pp. 1-11.

(Continued)

*Primary Examiner* — Ryan Barrett
(74) *Attorney, Agent, or Firm* — Mahamedi IP Law LLP

(57) ABSTRACT

A method for requesting an on-demand service on a computing device is provided. One or more processors determine the current location of the computing device. A multistate selection feature of a plurality of service options for providing the on-demand service is presented on the display of the computing device. The multistate selection feature enables a user to select a service option that is available within a region that includes the current location to provide the on-demand service. In response to the user selecting one of the plurality of service options, a summary user interface is presented on the display to provide region-specific information about the on-demand service based on the selected service option.

15 Claims, 15 Drawing Sheets

(51) Int. Cl.

| | | |
|---|---|---|
| *G06Q 50/30* | (2012.01) | |
| *G06Q 30/06* | (2012.01) | |
| *G08G 1/00* | (2006.01) | |
| *H04W 4/02* | (2018.01) | |
| *H04L 29/08* | (2006.01) | |
| *G06Q 20/10* | (2012.01) | |
| *H04B 1/3827* | (2015.01) | |
| *H04W 4/029* | (2018.01) | |

(52) U.S. Cl.
CPC ......... *G06Q 30/06* (2013.01); *G06Q 30/0621* (2013.01); *G06Q 30/0635* (2013.01); *G06Q 30/0641* (2013.01); *G06Q 50/30* (2013.01); *G08G 1/202* (2013.01); *H04B 1/3827* (2013.01); *H04L 67/18* (2013.01); *H04L 67/32* (2013.01); *H04W 4/02* (2013.01); *H04W 4/029* (2018.02)

(56) References Cited

U.S. PATENT DOCUMENTS

| | | | |
|---|---|---|---|
| 5,168,451 A | 12/1992 | Bolger | |
| 5,293,642 A | 3/1994 | Lo | |
| 5,862,244 A | 1/1999 | Kleiner et al. | |
| 5,930,474 A | 7/1999 | Dunworth et al. | |
| 6,057,831 A * | 5/2000 | Harms | H04N 5/445 348/E17.001 |
| 6,339,745 B1 * | 1/2002 | Novik | G07C 5/008 342/357.31 |
| 6,356,838 B1 | 3/2002 | Paul | |
| 6,417,856 B1 * | 7/2002 | Tamura | A63F 13/10 345/474 |
| 6,446,004 B1 | 9/2002 | Cao | |
| 6,456,207 B1 | 9/2002 | Yen | |
| 6,456,852 B2 | 9/2002 | Bar | |
| 6,516,056 B1 | 2/2003 | Justice et al. | |
| 6,519,463 B2 | 2/2003 | Tendler | |
| 6,522,342 B1 * | 2/2003 | Gagnon | H04H 60/25 715/716 |
| 6,591,253 B1 | 7/2003 | Dinkin | |
| 6,697,730 B2 | 2/2004 | Dickerson | |
| 6,756,913 B1 | 6/2004 | Ayed | |
| 6,804,658 B2 | 10/2004 | Lim et al. | |
| 6,925,381 B2 | 8/2005 | Adamczyk | |
| 7,064,681 B2 | 6/2006 | Horstmeyer | |
| 7,089,110 B2 | 8/2006 | Pechatnikov et al. | |
| 7,113,110 B2 | 9/2006 | Horstmeyer | |
| 7,119,716 B2 | 10/2006 | Horstmeyer | |
| 7,191,057 B2 | 3/2007 | Adamcyzk | |
| 7,315,780 B2 | 1/2008 | Sugahara et al. | |
| 7,319,414 B2 | 1/2008 | Horstmeyer | |
| 7,394,386 B2 | 7/2008 | Nowlan | |
| 7,395,140 B2 * | 7/2008 | Christie | B61L 25/025 246/122 R |
| 7,412,042 B2 | 8/2008 | Henry | |
| 7,412,715 B2 * | 8/2008 | Kim | H04N 5/44513 348/731 |
| 7,434,177 B1 | 10/2008 | Ording et al. | |
| 7,479,899 B2 | 1/2009 | Horstmeyer | |
| 7,479,900 B2 | 1/2009 | Horstmeyer | |
| 7,479,901 B2 | 1/2009 | Horstmeyer | |
| 7,487,467 B1 | 2/2009 | Kawahara et al. | |
| 7,504,966 B2 | 3/2009 | Horstmeyer | |
| 7,528,742 B2 | 5/2009 | Horstmeyer | |
| 7,538,691 B2 | 5/2009 | Horstmeyer | |
| 7,482,952 B2 | 6/2009 | Horstmeyer | |
| 7,552,063 B1 | 6/2009 | McEachern | |
| 7,561,069 B2 | 7/2009 | Horstmeyer | |
| 7,673,251 B1 | 3/2010 | Wibisono | |
| 7,756,615 B2 * | 7/2010 | Barfoot | G05D 1/0297 180/168 |
| 7,756,633 B2 | 7/2010 | Huang | |
| 7,864,935 B2 | 1/2011 | Elliott | |
| 7,869,945 B2 | 1/2011 | Huang | |
| 7,876,239 B2 | 1/2011 | Horstmeyer | |
| 7,970,533 B2 | 6/2011 | Huang | |
| 7,974,779 B2 | 7/2011 | Huang | |
| 8,036,824 B2 | 10/2011 | Huang | |
| 8,068,037 B2 | 11/2011 | Horstmeyer | |
| 8,086,400 B2 | 12/2011 | Huang | |
| 8,099,085 B2 | 1/2012 | Lowry | |
| 8,131,307 B2 | 3/2012 | Lubeck et al. | |
| 8,140,256 B1 | 3/2012 | dos-Santos | |
| 8,224,571 B2 | 7/2012 | Huang | |
| 8,232,899 B2 | 7/2012 | Horstmeyer | |
| 8,242,935 B2 | 8/2012 | Horstmeyer | |
| 8,271,316 B2 | 9/2012 | Blackshaw et al. | |
| 8,284,076 B1 | 10/2012 | Horstmeyer | |
| 8,362,927 B2 | 1/2013 | Horstmeyer | |
| 8,368,562 B2 | 2/2013 | Horstmeyer | |
| 8,374,627 B2 | 2/2013 | Howard et al. | |
| 8,386,593 B1 | 2/2013 | Gao | |
| 8,531,317 B2 | 9/2013 | Horstmeyer | |
| 8,554,608 B1 | 10/2013 | O'Connor | |
| 8,564,459 B2 | 10/2013 | Horstmeyer | |
| 8,775,938 B2 * | 7/2014 | Rosser | G06F 17/30056 715/730 |
| 2002/0034292 A1 | 3/2002 | Tuoriniemi et al. | |
| 2002/0077905 A1 | 6/2002 | Arndt | |
| 2002/0095326 A1 | 7/2002 | Katz | |
| 2002/0138338 A1 | 9/2002 | Trauth et al. | |
| 2002/0194129 A1 | 12/2002 | Furuya et al. | |
| 2003/0040944 A1 | 2/2003 | Hileman | |
| 2003/0043206 A1 | 3/2003 | Duarte | |
| 2003/0087648 A1 | 5/2003 | Mezhvinsky et al. | |
| 2003/0137435 A1 | 7/2003 | Haddad | |
| 2004/0049424 A1 | 3/2004 | Murray | |
| 2004/0054428 A1 | 3/2004 | Sheha et al. | |
| 2004/0070602 A1 * | 4/2004 | Kobuya | G01C 21/36 715/738 |
| 2004/0093280 A1 | 5/2004 | Yamaguchi | |
| 2004/0100479 A1 | 5/2004 | Nakano et al. | |
| 2004/0106399 A1 | 6/2004 | Ki | |
| 2004/0112959 A1 | 6/2004 | Jun | |
| 2004/0155907 A1 | 8/2004 | Yamaguchi | |
| 2004/0158483 A1 | 8/2004 | LeCouturier | |
| 2004/0185842 A1 | 9/2004 | Spaur et al. | |
| 2004/0219933 A1 | 11/2004 | Faith | |
| 2004/0243430 A1 | 12/2004 | Horstmeyer | |
| 2004/0249818 A1 | 12/2004 | Isaac | |
| 2004/0254717 A1 | 12/2004 | Sugahara et al. | |
| 2004/0254811 A1 | 12/2004 | Horstmeyer | |
| 2004/0260470 A1 | 12/2004 | Rast | |
| 2005/0091596 A1 | 4/2005 | Anthony et al. | |
| 2005/0149382 A1 | 7/2005 | Fenner et al. | |
| 2005/0227704 A1 | 10/2005 | Ferra et al. | |
| 2005/0240512 A1 * | 10/2005 | Quintero | G06Q 30/0603 705/37 |
| 2005/0278063 A1 | 12/2005 | Hersh et al. | |
| 2005/0278114 A1 | 12/2005 | Ahmad | |
| 2006/0034201 A1 | 2/2006 | Umeda et al. | |
| 2006/0048076 A1 | 3/2006 | Vronay et al. | |
| 2006/0059023 A1 | 3/2006 | Mashinsky | |
| 2006/0094447 A1 | 5/2006 | Zellner | |
| 2006/0135134 A1 | 6/2006 | Mezhvinsky et al. | |
| 2006/0136254 A1 | 6/2006 | Greenstein | |
| 2006/0149681 A1 | 7/2006 | Meisner | |
| 2006/0155460 A1 | 7/2006 | Raney | |
| 2006/0161346 A1 | 7/2006 | Murakami et al. | |
| 2006/0178949 A1 | 8/2006 | McGrath | |
| 2006/0200306 A1 | 9/2006 | Adamcyzk | |
| 2006/0200396 A1 | 9/2006 | Satterfield | |
| 2006/0217885 A1 | 9/2006 | Crady et al. | |
| 2006/0229778 A1 | 10/2006 | Obradovich et al. | |
| 2006/0268100 A1 | 11/2006 | Karukka et al. | |
| 2006/0271867 A1 | 11/2006 | Wang et al. | |
| 2007/0073477 A1 | 3/2007 | Krumm et al. | |
| 2007/0103342 A1 | 5/2007 | Milleville | |
| 2007/0176796 A1 | 8/2007 | Bliss et al. | |
| 2007/0197229 A1 | 8/2007 | Kalliola | |
| 2007/0198276 A1 | 8/2007 | Hinrichs et al. | |
| 2008/0005695 A1 | 1/2008 | Ozzie | |

(56) References Cited

U.S. PATENT DOCUMENTS

| | | | |
|---|---|---|---|
| 2008/0070593 A1 | 3/2008 | Hill | |
| 2008/0076451 A1 | 3/2008 | Sheha et al. | |
| 2008/0114629 A1 | 5/2008 | Pavlov | |
| 2008/0125967 A1 | 5/2008 | Sprigg | |
| 2008/0172173 A1 | 7/2008 | Chang et al. | |
| 2008/0178116 A1 | 7/2008 | Kim | |
| 2008/0189207 A1 | 8/2008 | Wurster | |
| 2008/0195428 A1 | 8/2008 | O'Sullivan | |
| 2008/0270019 A1 | 10/2008 | Anderson | |
| 2008/0270204 A1 | 10/2008 | Poykko | |
| 2008/0277183 A1 | 11/2008 | Huang | |
| 2008/0288880 A1 | 11/2008 | Reponen et al. | |
| 2008/0307512 A1 | 12/2008 | Tandon | |
| 2009/0030885 A1 | 1/2009 | DePasquale et al. | |
| 2009/0037101 A1* | 2/2009 | Koike | G01C 21/3664 701/533 |
| 2009/0049119 A1 | 2/2009 | Marcinkiewicz et al. | |
| 2009/0083111 A1 | 3/2009 | Carr | |
| 2009/0099971 A1 | 4/2009 | Salemme et al. | |
| 2009/0106124 A1 | 4/2009 | Yang | |
| 2009/0125228 A1 | 5/2009 | Dicke | |
| 2009/0156241 A1 | 6/2009 | Staffaroni et al. | |
| 2009/0171529 A1 | 7/2009 | Hayatoma | |
| 2009/0171576 A1 | 7/2009 | Kim et al. | |
| 2009/0172599 A1 | 7/2009 | Nezu | |
| 2009/0176508 A1 | 7/2009 | Lubeck et al. | |
| 2009/0177384 A1 | 7/2009 | Walder | |
| 2009/0177385 A1 | 7/2009 | Matas et al. | |
| 2009/0177502 A1 | 7/2009 | Doinoff et al. | |
| 2009/0192851 A1 | 7/2009 | Bishop | |
| 2009/0204920 A1 | 8/2009 | Beverley et al. | |
| 2009/0216600 A1 | 8/2009 | Hill | |
| 2009/0222284 A1 | 9/2009 | McEachern | |
| 2009/0254270 A1 | 10/2009 | Yu | |
| 2009/0282353 A1 | 11/2009 | Halbherr et al. | |
| 2009/0313077 A1 | 12/2009 | Wheeler | |
| 2009/0326991 A1* | 12/2009 | Wei | G06Q 10/02 705/5 |
| 2010/0017275 A1 | 1/2010 | Carlson | |
| 2010/0023246 A1 | 1/2010 | Zhao | |
| 2010/0035596 A1 | 2/2010 | Nachman et al. | |
| 2010/0070334 A1 | 3/2010 | Monteverde | |
| 2010/0076988 A1 | 3/2010 | Kenedy et al. | |
| 2010/0088026 A1* | 4/2010 | Manolescu | G08G 1/20 701/469 |
| 2010/0115455 A1 | 5/2010 | Kim | |
| 2010/0121689 A1 | 5/2010 | Wallace | |
| 2010/0153292 A1 | 6/2010 | Zheng et al. | |
| 2010/0182265 A1 | 7/2010 | Kim | |
| 2010/0198453 A1 | 8/2010 | Dorogusker et al. | |
| 2010/0199213 A1 | 8/2010 | Suzuki | |
| 2010/0211340 A1* | 8/2010 | Lowenthal | B60L 11/1816 702/63 |
| 2010/0235085 A1 | 9/2010 | Kikuchi | |
| 2010/0243724 A1 | 9/2010 | Golla | |
| 2010/0228415 A1 | 11/2010 | Paul | |
| 2010/0299436 A1 | 11/2010 | Khalid | |
| 2011/0010300 A1 | 1/2011 | Audet | |
| 2011/0050588 A1 | 3/2011 | Li | |
| 2011/0052110 A1 | 3/2011 | Kim | |
| 2011/0060480 A1 | 3/2011 | Mottla et al. | |
| 2011/0069017 A1 | 3/2011 | Victor | |
| 2011/0099040 A1 | 4/2011 | Felt et al. | |
| 2011/0060600 A1 | 5/2011 | Fox et al. | |
| 2011/0112952 A1* | 5/2011 | Annunziata | G06Q 40/04 705/37 |
| 2011/0137696 A1 | 6/2011 | Meyer et al. | |
| 2011/0137699 A1 | 6/2011 | Ronen et al. | |
| 2011/0153192 A1 | 6/2011 | Lin | |
| 2011/0153453 A1 | 6/2011 | Gameelah | |
| 2011/0153495 A1 | 6/2011 | Dixon | |
| 2011/0177845 A1* | 7/2011 | Fasold | G09B 29/007 455/566 |
| 2011/0197131 A1 | 8/2011 | Duffin et al. | |
| 2011/0208732 A1 | 8/2011 | Melton et al. | |
| 2011/0218992 A1 | 9/2011 | Waldman et al. | |
| 2011/0221765 A1 | 9/2011 | Nason et al. | |
| 2011/0238690 A1* | 9/2011 | Arrasvuori | G06F 3/04812 707/769 |
| 2011/0283223 A1* | 11/2011 | Vaittinen | G01C 21/3647 715/781 |
| 2011/0307282 A1* | 12/2011 | Camp | G06Q 10/02 705/7.11 |
| 2011/0313880 A1 | 12/2011 | Paul et al. | |
| 2012/0041675 A1 | 2/2012 | Juliver | |
| 2012/0084676 A1 | 4/2012 | de Paz | |
| 2012/0130627 A1 | 5/2012 | Islam et al. | |
| 2012/0179764 A1 | 7/2012 | Erdal | |
| 2012/0203599 A1* | 8/2012 | Choi | G06Q 30/02 705/13 |
| 2012/0225671 A1 | 9/2012 | Lubeck et al. | |
| 2012/0226390 A1* | 9/2012 | Adams | G07C 5/008 701/1 |
| 2012/0232943 A1 | 9/2012 | Myr | |
| 2012/0239452 A1 | 9/2012 | Trivedi et al. | |
| 2012/0313965 A1 | 12/2012 | Mochizuki et al. | |
| 2012/0323642 A1* | 12/2012 | Camp | G06Q 10/02 705/13 |
| 2012/0327009 A1 | 12/2012 | Fleizach | |
| 2012/0330778 A1* | 12/2012 | Eastham | G06Q 30/02 705/26.7 |
| 2013/0024249 A1 | 1/2013 | Zohar et al. | |
| 2013/0041720 A1 | 2/2013 | Spires | |
| 2013/0050131 A1* | 2/2013 | Lee | G08G 1/09626 345/174 |
| 2013/0132140 A1* | 5/2013 | Amin | G06Q 10/02 705/7.13 |
| 2013/0132246 A1* | 5/2013 | Amin | G06Q 40/10 705/34 |
| 2013/0132887 A1 | 5/2013 | Amin et al. | |
| 2013/0162627 A1 | 6/2013 | Gabara | |
| 2013/0191141 A1* | 7/2013 | Chun | G06Q 50/22 705/2 |
| 2013/0204676 A1 | 8/2013 | Hindi et al. | |
| 2013/0268406 A1 | 10/2013 | Radhakrishnan et al. | |
| 2013/0290040 A1 | 10/2013 | Perry et al. | |
| 2014/0026065 A1 | 1/2014 | Wang | |
| 2014/0047346 A1 | 2/2014 | Karamchedu | |
| 2014/0051465 A1 | 2/2014 | Ruys et al. | |
| 2014/0067491 A1* | 3/2014 | James | G06Q 50/30 705/13 |
| 2014/0129135 A1 | 5/2014 | Holden et al. | |
| 2014/0129302 A1 | 5/2014 | Amin et al. | |
| 2014/0172727 A1* | 6/2014 | Abhyanker | G06Q 30/0645 705/307 |
| 2014/0180732 A1* | 6/2014 | Rotchin | G06Q 10/083 705/5 |
| 2014/0180733 A1* | 6/2014 | Rotchin | G06Q 10/02 705/5 |
| 2015/0012341 A1* | 1/2015 | Amin | G07B 15/00 705/13 |
| 2015/0046080 A1 | 2/2015 | Wesselius et al. | |
| 2017/0186056 A1* | 6/2017 | Amin | G06Q 30/0284 |

FOREIGN PATENT DOCUMENTS

| | | |
|---|---|---|
| CN | 102682593 | 9/2012 |
| GB | 2367979 | 4/2002 |
| JP | 2001/188996 A | 7/2001 |
| JP | 2002/024659 A | 1/2002 |
| KR | 10-2005-0015772 | 2/2005 |
| KR | 10-2009-0109044 | 10/2009 |
| KR | 10-1006599 | 1/2011 |
| WO | WO99/44186 | 9/1999 |
| WO | WO 2002/006994 | 1/2002 |
| WO | WO2010/056923 | 11/2009 |
| WO | WO 2011/014076 | 3/2011 |

(56) References Cited

FOREIGN PATENT DOCUMENTS

OTHER PUBLICATIONS

Examination Report for Australian Application No. 2010325793, dated Jun. 21, 2013.
Search Report dated Oct. 1, 2013, for related EP Application No. 10835261.8.
Alfred Round et al. "Future Ride: Adapting New Technologies to Paratransit in the United States", Working Paper, UCTC No. 306, University of California Transportation Center, 51 pages.
International Search Report and Written Opinion, International Application No. PCT/US2013/68025, dated Apr. 15, 2014, pp. 12.
Shigematsu et al. "AVM System", Fujistu Ten Technical Journal No. 33, 27:34, (2009).
Uber iPhone app update 1.0.48 , Jun. 27, 2011, http:/blog.uber.com/ 2011/06/27/uber-iphone-app-update 1-0-48.
Chinese Search Report dated Jun. 22, 2016 in CN 2013800627666.
International Search Report and Written Opinion, International Application No. PCT/US2015/056703 dated Feb. 2, 2016.
EESR in EP 10835261.8 dated Oct. 10, 2016.
Kikuchi, et al., "Advanced Traveler Aid Systems for Public Transportation", US Department of Transportation, Sep. 1994.
Fu, et al., "On-Line and Off-Line Routing and Scheduling of Dial-a-Ride Paratransit Vehicles", Computer-Aided Civil and Infrastructure Engineering 14 (1999).
Edward W. Walbridge, "Real-Time Ridesharing Using Wireless Pocket Phones to Access the Ride Matching Computer", 1995 IEEE.
Examination Report No. 2 for Australian Application No. 2015202596 dated May 22, 2017.
Examination Report No. 1 for Australian Application No. 2016210772 dated Nov. 14, 2017.
Office Action in European Application No. 13853639.6 dated Jun. 11, 2018.
Examination Report No. 2 for Australian Application No. 2016210722 dated Jul. 27, 2018.
Walsh, HTML5 Link Prefetching, Jul. 7, 2010, https:// davidwalsh. name/html5-prefetch.
Gill et al., AMP: Adaptive Multi-stream Prefetching in a Shared Cache, Dec. 19, 2006, https://www.usenix.org/ legacy/events/fast07/ tech/full_papers/gill/gill_html/ amp-html.html.
Gill et al., AMP: Adaptive Multi-stream Prefetching in a Shared Cache—Introduction, Dec. 19, 2006, https://www.usenix.org/ legacy/ events/fast07/tech/full_papers/gill/gill_html/node1.html.

* cited by examiner

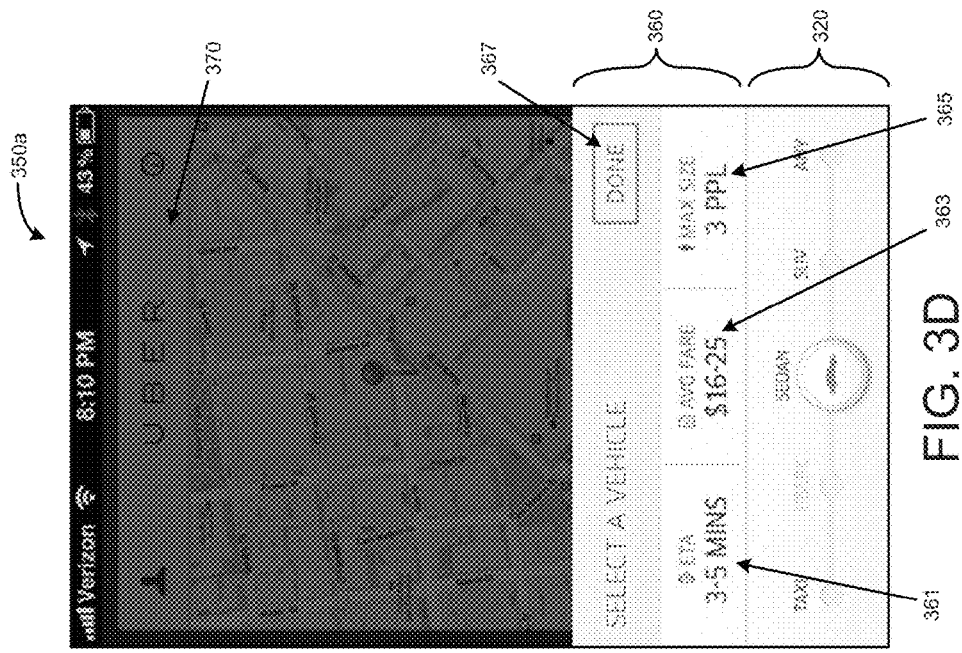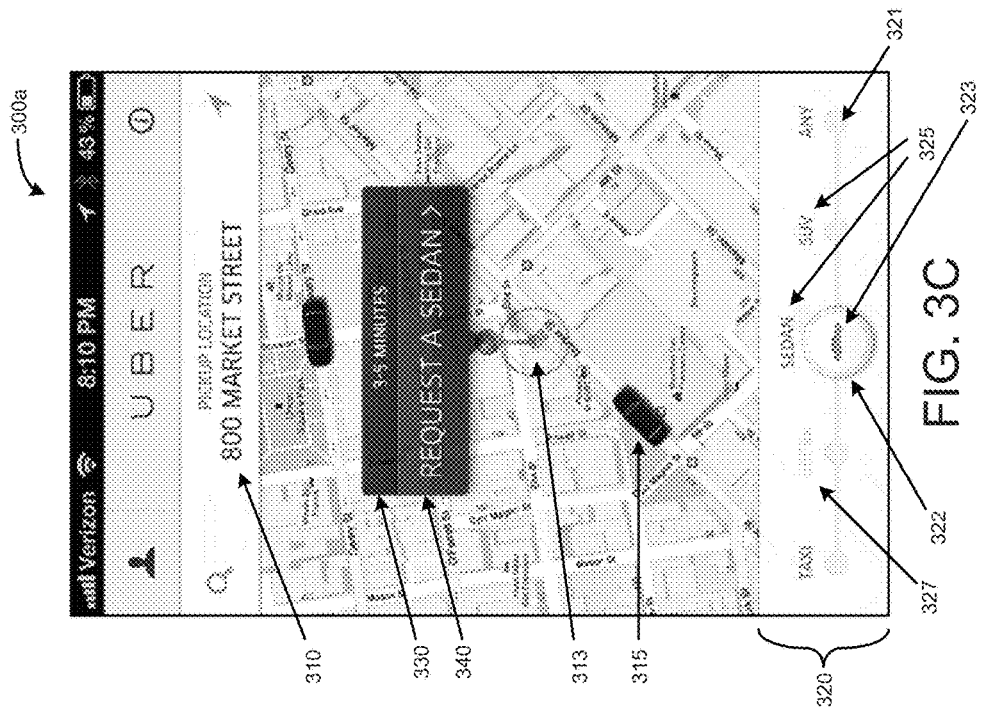

PROVIDING ON-DEMAND SERVICES THROUGH USE OF PORTABLE COMPUTING DEVICES

RELATED APPLICATIONS

This application fully incorporate by reference the following commonly owned patent applications: U.S. patent application Ser. No. 13/672,634, filed Nov. 8, 2012, entitled "Providing On-Demand Services Through Use of Portable Computing Devices", U.S. patent application Ser. No. 12/961,493, filed Dec. 6, 2010, entitled "System and Method for Arranging Transport Amongst Parties Through Use of Mobile Devices," and Provisional U.S. Patent Application No. 61/266,996, filed Dec. 4, 2009.

TECHNICAL FIELD

Embodiments described herein pertain generally to a system and method for providing on-demand services through use of portable computing devices.

BACKGROUND

Current on-demand services, such as fleet management systems employed for Taxi and limousine fleets, typically utilize onboard metering devices, radios, and cell phones to dispatch drivers and monitor fares. Such systems typically are not communicative to customers that are waiting for pickup. Furthermore, little information is tracked about individual fares. Moreover, conventional approaches rely on the customer making payment directly to the driver by credit card or cash.

BRIEF DESCRIPTION OF THE DRAWINGS

FIGS. 3A-3H illustrate examples of user interfaces that are displayed to a user to enable the user to request an on-demand service, according to an embodiment.

DETAILED DESCRIPTION

Figure 1:
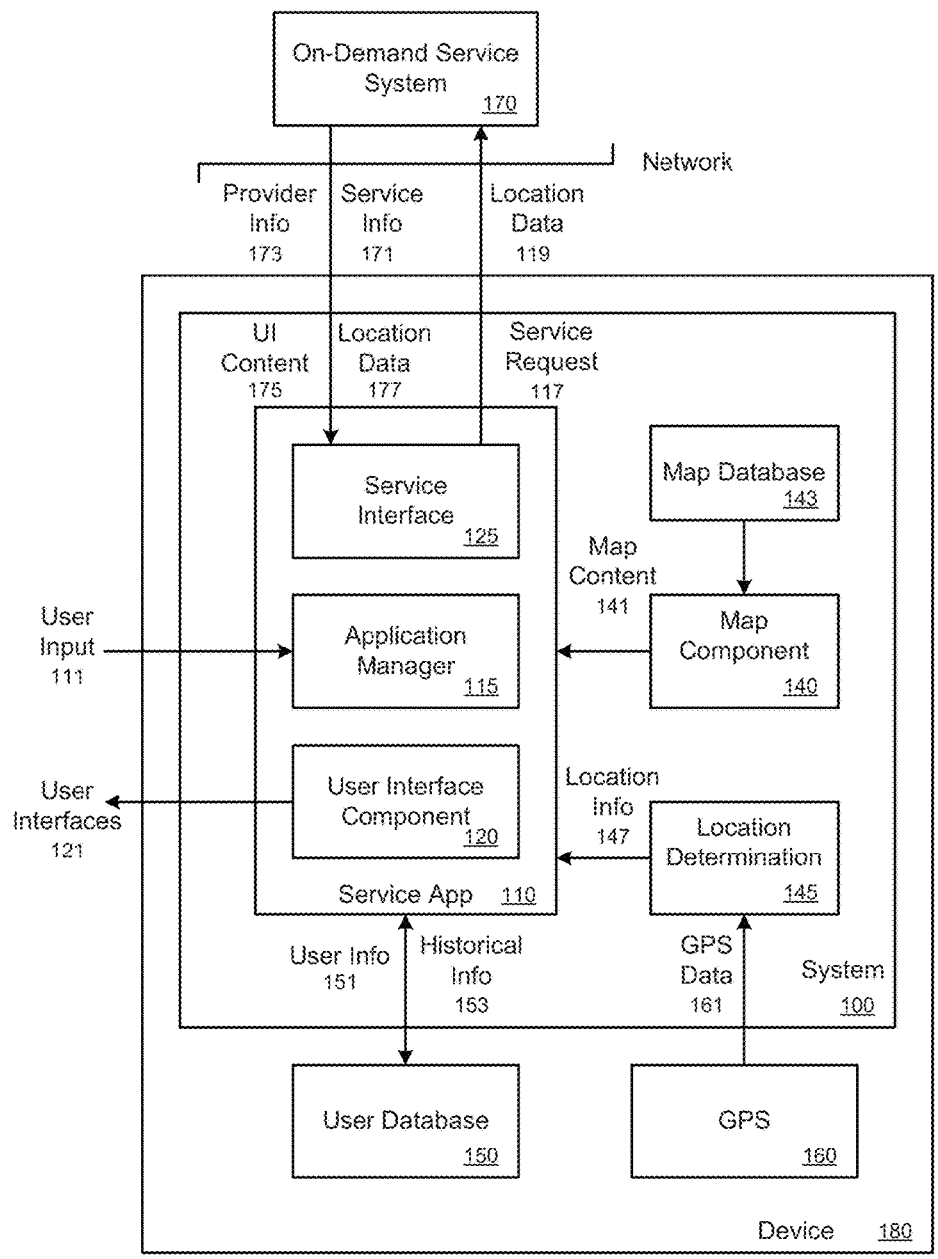
FIG. 1 illustrates an example system for enabling a user to request on-demand services using a computing device, under an embodiment.

Embodiments described herein provide an interactive environment for enabling a user to request on-demand services using a computing device. In particular, some embodiments described herein enable mobile computing devices, such as smart phones and geo-aware cellular telephony devices, to be used in connection with an on-demand service that enables the user to request services, such as a delivery service or transport service, using a simplified user interface schematic. Functionality, such as communicating the location of the user, the location of available service providers, the types of service available, the estimated fees and other information, can be aggregated and provided to the user in an efficient and user-friendly manner.

In one embodiment, a computing device can operate an application for requesting on-demand services. The application can provide user interface features that provide a user of the application with information for enabling the user to request a particular type of service. For example, the user can be provided a mechanism for selecting services and service types, as well as displaying information that may affect the decision of the user in making such selections.

According to some embodiments, the information and service options made available to the user can be region-specific. For example, different on-demand services and information about different services can be provided to the user based on the region that the user is located in. Thus, the service options made available to the user, as well as the information provided to the user regarding the service options can be made region specific.

In some embodiments, different user interface features can be provided, at least in part, by an application or program that is stored and operated on the user's computing device. The application can be configured to communicate with an on-demand service system that arranges services between users and service providers (e.g., drivers for transport, ice cream delivery providers, personal telegram service providers, etc.). For example, a user can request food to be delivered to his or her office, and the on-demand service system can determine available food providers that satisfy the user's request and arrange for a food provider to perform the service. The user is enabled, via the user interface features, to make different selections for viewing specified information and for requesting different on-demand service options based on the user selections.

According to an embodiment, a location of the computing device can be determined so that user interface features for requesting an on-demand service can be presented, on a display of the computing device, based on the device's real-time location. A multistate selection feature can be provided to enable a user to select a particular type of service. In one implementation, the multistate selection feature identifies a plurality of service options for an on-demand service (e.g., types of vehicles that can provide a transport service for the user, types of food trucks, delivery methods, etc.), based on a region where the user is located (e.g. the device's real-time location).

In one embodiment, a summary user interface can be presented on the display in response to the user selecting one of the plurality of the service options, such as a vehicle type for a delivery or transport, or type of food service. The summary user interface can include region-specific information about the on-demand service that is particular to and based on the selected service option. For example, for an on-demand food service, the summary user interface can include region-specific information about the closest food service providers, types of foods available in the region, average prices for the foods, the inventory available, etc. In another example, the region-specific information can include an estimated time of arrival to the user's current location, the average price, the amount of space/capacity of the vehicle, etc. The provided information can assist the user in making a better informed decision in requesting the on-demand service. In some implementations, the user can interact with the multistate selection feature by selecting different service types or service options to cause the contents within the summary user interface to dynamically change accordingly.

Still further, in some embodiments, once the user requests the on-demand service based on the selected service option, a confirmation user interface feature can be displayed to present additional features and information that the user can verify before confirming the request. When the user confirms the request (e.g., places an order), the computing device can provide the service request to the on-demand service system with necessary user data so that the on-demand service system can arrange the service between the user and an available service provider. The user can provide additional information on the confirmation user interface feature, such as, for example, special notes for the service provider or a promotional code before confirming the request.

As described herein, a "user," or a "customer" refer to individuals that are requesting or ordering an on-demand service. Also as described herein, a "provider," or a "service provider" refer to individuals or entities that can provide the requested service. As an example, a user can request an on-demand service (e.g., car/Taxi service, food delivery, messenger service, telegram service, or provide a product) using the system, and a service provider can communicate with the system and/or the user to arrange to perform the service. In addition, as described herein, "customer devices" and "provider devices" refer to computing devices that can correspond to desktop computers, cellular or smartphones, personal digital assistants (PDAs), laptop computers, tablet devices, television (IP Television), etc., that can provide network connectivity and processing resources for enabling a user to communicate with a system over a network. A provider device can also correspond to taxi meters or other metering devices.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, personal digital assistants (e.g., PDAs), laptop computers, printers, digital picture frames, network equipments (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example on-demand service user interface system, under an embodiment. According to some embodiments, system 100 can be implemented through software that operates on a portable computing device, such as a mobile computing device 180. System 100 can be configured to communicate with one or more network services that coordinate or otherwise provide on-demand services. Additionally, the mobile computing device can include inherent or native functionality, and can utilize third-party services which enable further functionality through system 100.

As an alternative or addition, some or all of the components of system 100 can be implemented on one or more computing devices, such as on one or more servers or other mobile computing devices. System 100 can also be implemented through other computer systems in alternative architectures (e.g., peer-to-peer networks, etc.). Accordingly, system 100 can use data provided by an on-demand service system, data provided by other components of the mobile computing device, and information provided by a user in order to present user interface features and functionality for enabling the user to request an on-demand service. The user interface features can be specific to the location or region that the computing device is located in, so that region-specific information can be provided to the user. System 100 can also adjust the user interface features, including the content displayed as part of the user interface features, based on other user selections.

In some implementations, system 100 includes an on-demand service application 110, a map component 140, a map database 143, and a location determination 145. The components of system 100 can combine to provide user interface features that are specific to user selections, user locality, and/or real-time conditions to enable a user to request on-demand services. The on-demand service application 110 can correspond to a program that is downloaded onto a smartphone, portable computer device (e.g., tablet or other ego-aware device). In one implementation, a user can download and install the on-demand service application 110 on his or her computing device and register the computing device 180 with an on-demand service system of the entity.

The on-demand service application 110 can include an application manager 115, a user interface (UI) component 120, and a service interface 125. The service interface 125 can be used to handle communications exchanged between the on-demand service application 110 and the on-demand service system 170 (e.g., over a network). For example, the service interface 125 can use one or more network resources of the device 180 for exchanging communications over a wireless network. The network resources can include, for example, a cellular data/voice interface to enable the device to receive and send network communications over a cellular transport. As an alternative or variation, the network resources can include a wireless network interface for connecting to access points (e.g., Wireless Fidelity 802.11(g) or 802.11(n)) or for using other types of wireless mediums (e.g., WiMax)

The application manager 115 can receive user input 111, location information 147, and other information (such as user information 151 and/or historical information 153) to configure content that is to be provided by the UI component 120. For example, the UI component 120 can cause various user interface features 121 to be output to a display of the computing device 180. Some of the user interface features 121 can be region-specific (e.g., based on the current location of the computing device) to display information that is particular to the region. The user interface features 121 can also provide dynamically adjusted content based on user selections provided via the user input 111.

For example, the UI component 120 uses a UI framework that can be configured with various content, such as UI content 175 provided by the on-demand service system 170 and content as a result of user input. The UI component 120 can also configure the UI framework with location information 147 and map content 141. In this manner, a map of a region in which the user is currently located in can be displayed as part of a user interface feature 121. In some examples, the map component 140 can provide the map content 141 using map data stored in one or more map databases 143. Based on the locale of the user and the user selection(s) made for requesting an on-demand service, such as a type of food or a type of vehicle that the user would like to be transported in, the application manager 115 can cause region-specific and user-selection-specific UI content 175 to be presented with or as part of a user interface 121.

In some implementations, the user interfaces 121 can be configured by the application manager 115 to display information about on-demand services that are available for the user-specific region. On-demand services can include food services (e.g., users can order food, request mobile food providers such as food trucks, request dessert providers such as ice cream trucks), delivery services, transport services, telegram or entertainment services (e.g., users can request mariachi bands, singing quartets), or other services that the user can request via the on-demand service system. Based on the user's region, different services and service options can be available for the user.

For example, for an on-demand transport service, Taxicab vehicles may be available in one city, and unavailable in another. Similarly, a hybrid vehicle may be available in one city, and unavailable in another. In another example, for an entertainment service, an on-demand Mariachi band may be available in one country or region, and may not be available in other countries. In various examples described, the user interfaces 121, which displays information about services available for a user, as well as features to enable the user to request services, can be configured with network user interface content (e.g., provided by the on-demand service system 170) to reflect the services available to the user based on the user's geographic region. The user is enabled to interact with the different displayed user interface features 121, via the user input 111, to make selections and input preferences when requesting an on-demand service from the on-demand service system 170.

When the on-demand service application 110 is operated by the user, the various user interfaces 121 can be rendered to the user based on the user inputs 111 and/or information received from the on-demand service system 170. These user interfaces include, for example, a home page user interface (e.g., an initial page or launch page), a multistate selection feature, a summary user interface, a location suggestion user interface, a location search user interface, a confirmation user interface, or a combination of any of the features described. For example, the UI component 120 can cause a home page user interface 121 to be displayed that identifies the service(s) that the user can request using the on-demand service application 110. The home page user interface 121 can also provide only certain service selection options or types that are available in the user's region. In this manner, based on the current location of the computing device, the on-demand service application 110 can cause location-specific user interfaces 121 and content to be presented to the user.

In many instances, a geographic region that is specific to the user can be based on the user's current location (e.g., the current location of the computing device 180) or the user's requested service location (e.g., the pickup location for a transport service, or a delivery location for a food service). For example, in some cases, the current location can be different from the requested service location, so that the user can manually select a particular pickup location or delivery location that is different from the current location of the computing device 180. The user's current location or service performance location can be determined by the location determination 145.

The location determination 145 can determine the location of the computing device in different ways. In one example, the location determination 145 can receive global positioning system (GPS) data 161 from location-based/geo-aware resources 160 of the computing device 180. In addition, the location determination 145 can also receive GPS data 161 from other applications or programs that operate on the computing device 180. For example, system 100 can communicate with one or more other applications using one or more application program interfaces (APIs). The on-demand service application 110 can use the location information 147 to cause the UI component 120 to configure the UI framework based on the location information 147. In addition, the on-demand service application 110 can provide the user's location data 119 to the on-demand service system 170.

As an addition or alternative, the on-demand service application 110 can determine the user's current location or pickup location (i) by using location data 177 provided by the on-demand service system 170, (ii) by using user location input provided by the user (via a user input 111), and/or (iii) by using user info 151 and/or historical info 153 stored in one or more user databases 150.

For example, the on-demand service system 170 can cross-reference the location data 119 (received from the on-demand service application 110) with the other sources or databases (e.g., third party servers and systems) that maintain location information to obtain granular/specific data about the particular identified location. In some cases, by cross-referencing the data, the on-demand service system 170 can identify particular stores, restaurants, apartment complexes, venues, street addresses, etc., that are proximate to and/or located at the identified location, and provide this information as location data 177 to the on-demand service application 110. The application manager 115 can cause the UI component 120 to provide the specific location information as part of the user interface 121 so that the user can select a particular store or venue as the current location or the service performance location (e.g., a pick up location or delivery location).

The on-demand service application 110 can also receive user location input provided by the user to determine the current location or service location of the user. In one example, the on-demand service application 110 can cause the UI component 120 to present a location search user interface on the display. The user can input a search term to identify stores, restaurants, venues, addresses, etc., that the user wishes to request the on-demand service. The on-demand service application 110 can perform the search by querying one or more external sources to provide the search results to the user. In some variations, the user can manually provide user location input by entering an address (e.g., with a number, street, city, state) or by manipulating and moving a service location graphic/icon on a map that is displayed as part of a user interface 121. In response to the user selection, the on-demand service application 110 can provide the location data 119 to the on-demand service system 170.

In another variation, the on-demand service application 110 can retrieve and use user information 151 and/or historical information 153 that are stored in a user database 150. The user database 150 can include records of the user's previous on-demand service requests as well as user preferences. In some implementations, the user database 150 can be stored remotely at the on-demand service system 170 and user information can be retrieved from the on-demand service system 170. The on-demand service application 110 can use the data stored in the user database 150 to identify previous service locations for the user (e.g., a BBQ sandwiches food ordering application 110 can access the user database 150 for records of when the user ordered food and where the food was delivered to). Based, in part, on the current location of the computing device 180, the on-demand service application 110 can use the user information 151, such as the user's home address, the user's place of business, the user's preferences, etc., and historical information 153, such as the frequency and recency of previous locations that the user requested services at, to provide recent and/or recommended points of interest to the user. When the user selects one of the entries of a recommended point of interest as a current location and/or pickup location, the on-demand service application 110 can provide the location data 119 to the on-demand service system 170.

Based on the user's current location or service location, the application manager 115 can cause region-specific user interface features 121 to be outputted by the UI component 120. A region that is specific to the user includes the current location (or service location) in which on-demand services can be provided to the user. The region can be a city or metropolitan area in which the computing device 180 is currently located in, can be an area having a predetermined distance radius from current location (e.g., six miles), or can be an area that is specifically partitioned from other areas. Based on the user's region, the application manager 115 can cause region-specific information about the on-demand service to be provided on one or more user interface features 121.

Region-specific information about the on-demand service can be provided, in part, by the on-demand service system 170. As discussed, the on-demand service application 110 can provide location information to the on-demand service system 170 so that the on-demand service system 170 can arrange for a service to be provided to a user (e.g., arrange a transport service or an entertainment provider service). Based on the user-specified region, the on-demand service system 170 can provide information about available service providers (e.g., drivers, or mariachi bands) that can perform the on-demand service in that region.

For example, for a transport service, a transport on-demand service system 170 can maintain information about the number of available vehicles, the number of available drivers, which drivers are currently performing a transport service, which drivers are ready to pick up users, the current location of the vehicles, the direction and destination of the vehicles in motion, etc., in order to properly arrange the transport service between users and drivers. In another example, for a food service, a food on-demand service system 170 can maintain information about the different food trucks that are available, where the food trucks are, how long a food truck will be at a particular location, what type of foods are being served, etc. Because services can vary between regions, such as cities, the application manager 115 can cause only information pertinent to the user's specific region to be provided as part of the user interface 121.

Using the information maintained about the services and the service providers, the on-demand service system 170 can provide relevant information to the on-demand service application 110. Service information 171 can correspond to information about the particular on-demand service that can be arranged by the on-demand service system 170 (e.g., food services, delivery services, transport services, telegram or entertainment services). Service information 171 can include information about costs for the service, available service options (e.g., types of food available, types of entertainment, delivery options), or other details (e.g., available times, specials, etc.). Provider information 173 can correspond to information about the available service providers themselves, such as profile information about the providers, the current location or movement of the delivery vehicles, transport vehicles, food trucks, etc., or the types of vehicles.

Referring back to the example of an on-demand transport service, if the user requests pickup in San Francisco, Calif., the on-demand service system 170 would look for available drivers within a particular distance or particular pickup time from the user (e.g., the system would not consider drivers in Los Angeles, Calif.). The on-demand service system 170 can transmit relevant service information 171 (e.g., cost for the service, promotions in the area) and relevant provider information 173 (e.g., driver information, vehicle information) to the on-demand service application 110 so that the on-demand service application 110 can cause region-specific information to be presented to the user. For any type of on-demand service, the on-demand service system 170 can transmit service information 171 and/or service provider information 173 to the on-demand service application 110.

As an example, a region-specific user interface feature 121 can include a multistate selection panel. The multistate selection panel can include a multistate selection feature that can be manipulated and moved by the user (e.g., by interacting with an input mechanism or a touch-sensitive display screen) in order to select one or more service options to request the on-demand service. Based on the user's determined region, the multistate selection panel can identify and display only certain options that are available for providing the on-demand service in that region. For an on-demand transport service, for example, if limousines or SUVs are unavailable in a particular region, such as San Francisco, but Taxis, Sedans, and hybrid vehicles are available, the multistate selection panel can enable only the available vehicle types to be displayed and/or selected by the user. The indicators for the unavailable types of vehicles, such as limousines and SUVs, for example, can be blocked out, hidden, or displayed in a different manner than indicators for vehicle types that are available in that region.

Similarly, in an example for on-demand dessert, the multistate selection panel can provide different dessert types that are available for selection by a user in the region. If ice cream is unavailable for a particular region, while tarts, cookies, or cheesecakes are available for a user to request, the multistate selection panel can enable only tarts, cookies, or cheesecakes to be selected by the user in requesting the on-demand dessert service.

When the user interacts with the multistate selection feature, additional information corresponding to the selected service option can be provided in a region-specific user interface feature 121. In one implementation, the user interface feature 121 can correspond to a summary panel that displays region-specific information about the selected service option. For example, for an on-demand food or dessert service, once a user makes a selection of a type of service (e.g., a type of food or a certain food truck, etc.), the summary panel can display information about the closest available food provider, the average cost for an order, menu details, service provider profile information, or other information that the user can quickly view to make an informed decision.

In another example, for an on-demand transport service, the summary panel can provide region-specific information, such as the estimated time of arrival for pickup (based on the user's current location or pickup location and the current locations of the available vehicles of the selected type), the average fare based on the region (e.g., the average estimated fare can be region-specific because some regions can be more expensive than other regions and/or some vehicle types can be more expensive than other vehicle types), and the capacity of the vehicle (how many riders can fit in the vehicle). In one variation, the summary panel can be provided concurrently with the multistate selection panel so that when the user manipulates the multistate selection feature to select different service options, the content within the summary panel can be dynamically adjusted by the on-demand service application 110 to provide updated information corresponding to the selected option.

Once the user makes a selection by providing a user input 111, the application manager 115 can cause the UI component 120 to provide user interface features 121 that are based on the selected service option. The user can then make a request for the on-demand service based on the selection. In one example, when the user makes a request, a confirmation user interface feature 121 can be provided by the on-demand service application 110. From this user interface feature, the user can view the details of the request, such as what account or credit card to charge (and can edit or choose a different payment method), provide specific requests to the driver, enter a promotional code for a discount, calculate the price, cancel the request, or confirm the request. As an alternative, the request can be automatically confirmed without displaying a confirmation user interface feature 121.

After the user confirms the request for the on-demand service, the on-demand service application 110 can provide the service request 117 to the on-demand service system 170 via the service interface 125. In some examples, the service request 117 can include the service location specified by the user (e.g., the location where the user would like the service to be performed or provided), the user's account information, the selected service option, any specific notes or requests to the service provider, and/or other information provided by the user. Based on the received service request 117, the on-demand service system 170 can arrange the service between the user and an available service provider that is qualified and capable of providing the on-demand service. The on-demand service system 170 can provide additional provider information 173 to the on-demand service application 110, such as the particular service provider who will be fulfilling the service, the service provider's ratings, etc., so that this information can be provided to the user on a user interface 121.

Methodology

Figure 2:
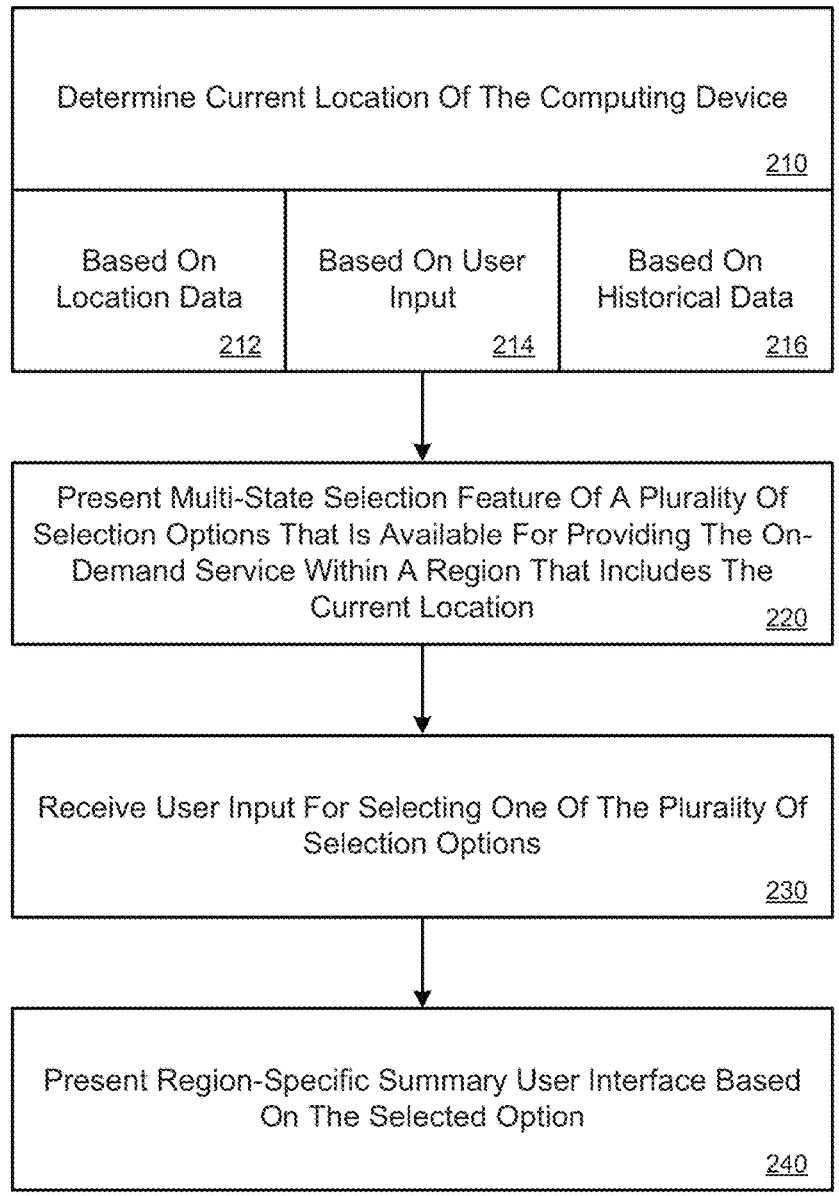
FIG. 2 illustrates an example method for enabling a user to request on-demand services using a computing device, according to an embodiment.

FIG. 2 illustrates an example method for providing on-demand service user interface features on a computing device, according to an embodiment. A method such as described by an embodiment of FIG. 2 can be implemented using, for example, components described with an embodiment of FIG. 1. Accordingly, references made to elements of FIG. 1 are for purposes of illustrating a suitable element or component for performing a step or sub-step being described.

The on-demand service application can automatically determine the current location of the computing device (step 210). According to different implementations, the current location of the computing device (or the selected service location for the on-demand service) can be determined based on location data provided by a geo-aware resource, such as a GPS component of the computing device (sub-step 212), based on user input to search and/or select particular locations (sub-step 214), and/or based on historical data of previous pickup locations of the user (sub-step 216). Using the current location or the service location of the user, a region or area (that includes the current location or the service location) in which the on-demand services are to be performed can be determined by the on-demand service application and/or the on-demand service system. In this manner, the on-demand service system can identify available service providers (e.g., drivers, food trucks, dessert providers, mariachi bands) in the region that can perform the on-demand service.

Based on the determined region and/or the determined current location or service location, a multistate selection feature for selecting one or more of a plurality of service options can be presented on a display of the computing device (step 220). The multistate selection feature can identify, and enable a user to select one of various service options available for a particular on-demand service. For example, the multistate selection feature can identify the specific available vehicle types (e.g., Sedan, Taxi, SUV, hybrid vehicle, electric vehicle, limousine, etc.) that the user can request for an on-demand transport service. The multistate selection feature identifies only those vehicle types that are available in that region to provide the on-demand transport service, so that vehicle types that are unavailable cannot be selected by the user. For example, in one region, such as a particular city, only Sedans and Taxis may be available, whereas in another city, Sedans, Taxis, and SUVs may be available for transport.

The user is enabled to interact with the multistate selection feature in order to make a selection of one or more of the plurality of service options (step 230). In one example, the multistate selection feature that is displayed to the user can be a slider panel with a selectable icon that can slide along a track. In other variations, the multistate selection feature can include features to toggle on or off each of the different available service options in that region. For example, on a mobile computing device with a touch-sensitive display, the user can tap on the different service options to cause the selectable icon to move to the selected option, or hold and drag the selectable icon between the different service options along a track or path. In some instances, when the user moves the selectable icon between the different service options, an indication can be displayed to provide feedback to the user (e.g., when the SUV vehicle type is selected for a transport application, the selectable icon can display an image of an SUV rather than an image of a Sedan or other previously selected vehicle type).

Once the user makes a selection of a service option, the application displays user interface features that are region-specific and selection-specific. In one implementation, a region-specific summary user interface is presented based on the selected service option of the user (step 240). The summary user interface can be region-specific because different regions can have different pricing structures based on usage of the service in the city, the amount of available service providers and/or users, the overall cost of living, etc. The summary user interface can provide a variety of region-specific and selection-specific content to the user so that the user can specify the transport service he or she prefers.

Again, referring to the on-demand transport service example, the summary user interface can identify the estimated time of arrival of the driver (having the selected vehicle type) to the user's current location or service location (e.g., pickup location). The summary user interface can also display the region-specific average fare for the vehicle of the selected type (e.g., the average fare can be an estimated fare based on the locations of the available vehicles and the location of the user), and identify the maximum capacity (number of people the vehicle can drive at once) for the selected vehicle type.

In some implementations, the summary user interface can also be displayed concurrently with the multistate selection feature so that when the user changes the selected service option to select a different service option, the summary user interface can dynamically after the content based on the adjusted selections. In this manner, the user can easily view the differences (e.g., differences in cost, vehicle size, estimated time for performing the service, estimated time of arrival, types of foods available, etc.) between the service options to make a better judgment on what on-demand service options to request.

User Interface Examples

Figure 3A:
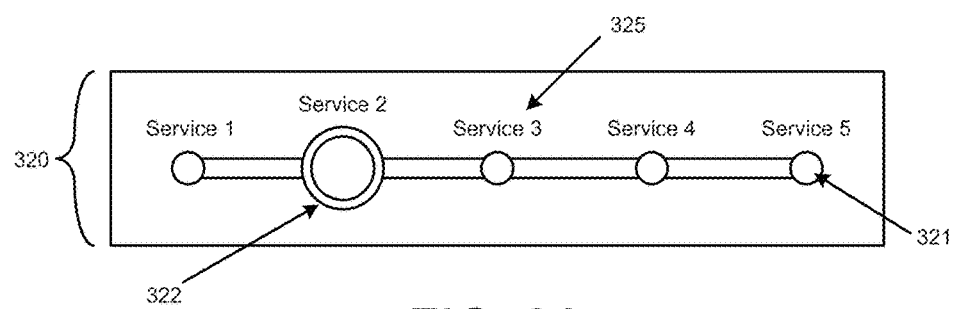
Figure 3B:
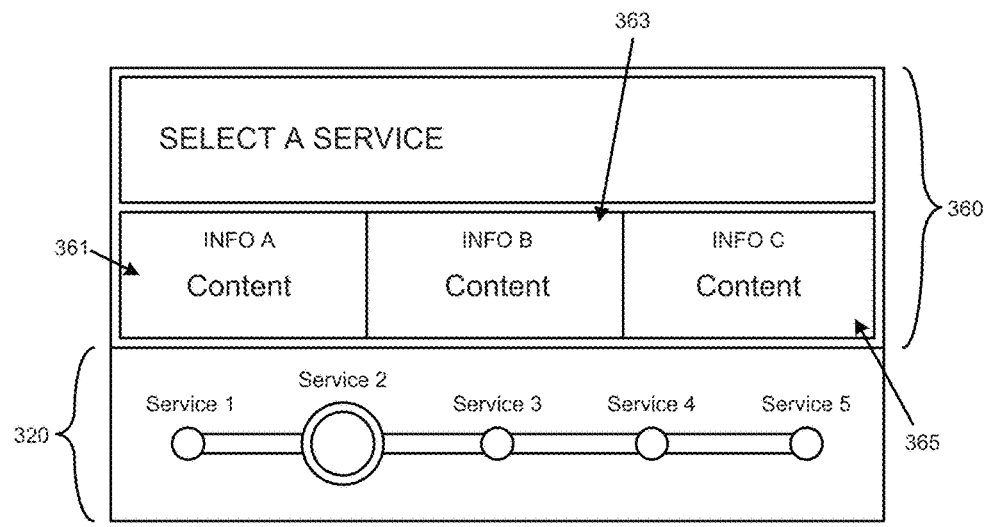

FIGS. 3A-3H illustrate examples of user interfaces that are displayed to a user to enable the user to request an on-demand service, according to an embodiment. FIG. 3A illustrates a multistate selection feature as described in FIGS. 1-2 and FIG. 3B illustrates a summary panel (concurrently with the multistate selection feature) as described in FIGS. 1-2. FIGS. 3C-3H illustrate a set of user interfaces that illustrate examples of user interfaces described in FIGS. 1-2. For example, the home page user interfaces 300*a*, 300*b*, 380 of FIGS. 3C, 3E, 3G, respectively, and the summary user interfaces 350*a*, 350*b* of FIGS. 3D, 3F, respectively, illustrate user interfaces that can be provided by a transport service application (e.g., which is an example of an on-demand service application) running or being operated on a user's computing device (e.g., a smart phone).

When a user initiates and operates the on-demand service application on his or her computing device, for example, a home page user interface can be provided to the user. The user can interact with features on the home page user interface in order to request a service. In some implementations, the home page user interface can include a multistate selection feature 320, as illustrated in FIG. 3A. The multistate selection feature 320 can include a track 321 and a slider feature 322 that can be manipulated by the user (via an input mechanism) to be moved along the track 321. Each resting point or "stop" on the track can correspond to a particular service feature or option that the user can select when requesting an on-demand service. The available service options can be identified with an identifier 325.

In some cases, based on the user's region, different service options can be provided with the multistate selection feature 320. For example, if the on-demand service application corresponds to a food delivery service, the service options provided with the multistate selection feature 320 can correspond to types of foods that are available in the user's region. The multistate selection feature 320 can be presented on the display to include only service options that are available so that options that are unavailable in that locale are not displayed or are displayed in a different fashion to be distinguishable to the user (e.g., a different color, shading, text type, etc.). In another example, the multistate selection feature 320 can prevent the user from making a selection of a service option that is unavailable if the user attempts to select a stop that corresponds to an unavailable service option. Once the user makes a selection, a summary panel can be provided to the user to display additional detail about the user's selection.

FIG. 3B illustrates a summary panel that can be displayed to the user by the on-demand service application. Depending on implementation, the summary panel 360 can be provided independently of the multistate selection feature 320 or be provided concurrently with the multistate selection feature 320. The summary panel 360 can provide region-specific information that also corresponds to the service option selection made by the user on the multistate selection feature 320. The summary panel 360 can include a plurality of sections 361, 363, 365 that each include dynamically provided content that is region-specific and selection-specific.

For example, for an on-demand entertainment application, the user can select a mariachi band via the multistate selection feature 320 (e.g., instead of a string quartet or jingle singing group, etc., that is available in the region). The summary panel 360 can include specific information about available mariachi bands in the user's region. The summary panel 360 can provide the average, actual, or estimated cost for the mariachi band in section 361, the number of band members available in section 363, or the earliest the band can perform the service in section 375, or other information, etc., to quickly provide the user with sufficient details in placing the order. In this manner, functionality, such as communicating a variety of information to the user, can be aggregated and provided to the user in an efficient and user-friendly manner.

FIGS. 3C-3H illustrate user interfaces that illustrate examples of user interfaces that are displayed by an on-demand service application. In particular, the user interfaces can be provided by an on-demand transport application. In various examples, features described in FIGS. 3C-3H can also be provided by other on-demand service applications (e.g., applications that can enable the user to request other on-demand services).

In FIG. 3C, a home page user interface or request user interface 300a can be presented on the display of the user's computing device. The home page user interface 300a can include a service location identifier 310 that identifies the determined current location of the computing device or the service location that the user has specified via user selections. In some examples, the service location identifier 310 can first automatically display the determined current location of the computing device without user selection. The service location identifier 310 can also be selectable by the user to change the current location (e.g., if the current location is incorrect) or the service location (e.g., the user will be somewhere else in the next few minutes and would prefer to get the service at a different location than the current location). The service location identifier 310 can display an address, a name of a location (e.g., store, park, restaurant, venue), street intersections, or user programmed identifier (e.g., "work," "parent's house," or "home" of the user).

The home page user interface 300a can also include a multistate selection feature 320. The multistate selection feature 320 can include a slider feature 322 that can be manipulated by the user to be moved along a track 321. The multistate selection feature 320 can identify a plurality of service types that are available for providing, for instance, a transport service for the user based on the user's current location (or pickup location). Depending on the user's location, available service providers can be determined for a particular region that includes the user's current location or pickup location. For example, the region can be a city, such as San Francisco, Calif., and the multistate selection feature 320 can identify vehicle types that are available for providing the transport service within the general vicinity or area of San Francisco, Calif.

In the example provided, the multistate selection feature 320 is region-specific so that only the vehicles that are specifically available in San Francisco, Calif. can be selected by the user. The available vehicle types in FIG. 3C include Taxis, Sedans, and SUVs or any type of vehicle available to the user. These vehicle types can each be indicated by an identifier 325 that is shown above a corresponding selection point along the track 321. The vehicle types that are not available in the region can be identified differently so that the user can determine which vehicle types cannot be selected for the transport service. In FIG. 3C, for example, "UBERx" vehicles, which are identified to be a different type of vehicle as compared to Taxis, Sedans, or SUVs (such as a limousine or hybrid vehicle), are not available in the region of San Francisco, Calif. Some examples to differentiate available types of vehicles as compared to unavailable types of vehicles include using providing an identifier 327 with different characteristics (e.g., varying font colors, font shading, font sizes), or by not including an identifier in its entirety or blocking out the identifier 327 from appearing on the multistate selection feature 320.

In some variations, when the user manipulates the slider feature 322 by moving it between the different selection points along the track 321, the identifier 325 of the selected vehicle type can also be changed to identify the selection. For example, the identifier "Sedan" is elevated as compared to the other identifiers to indicate the selection of "Sedan" type vehicles. In other examples, the selected identifier can be altered in size, color, font, etc., to easily indicate to the user of the selection. As an addition, the graphic 323 provided within the slider feature 322 can dynamically change in order to correspond to the selection (e.g., a graphic of a vehicle that corresponds to a selected vehicle type, a graphic of food type, a graphic of an entertainment selection, etc.).

In one implementation, the slider feature 322 can initially be positioned at a default vehicle type or a default vehicle type that is selected and programmed by the user. In other variations, the slider feature 322 can be initially positioned at a vehicle type that has most frequently been used by the user to request the transport service, or can initially be positioned at a vehicle type that was previously used by the user to request a transport service.

The home page user interface 300a can also include a map that illustrates at least a portion of the region in which the user's current location or pickup location is located in. The map can include a graphic pin 313 that indicates the user's current location or pickup location. In some implementations, the home page user interface 300a can also include a feature (proximate to or as part of the graphic pin 313) that indicates an estimated time of arrival 330 of an available service provider having a vehicle of the selected type, and a request selection feature 340 to enable the user to request the transport service using the selected vehicle type. The estimated time of arrival 330 can dynamically be altered in response to the user changing the selection by moving the slider feature 322 along the track 321.

In some examples, the on-demand service application that operates on the user's computing device can communicate with the on-demand service system to receive real-time information about service providers in the determined region of the user. The on-demand service system can continually (periodically) receive data from the computing devices of the service providers (e.g., such as GPS data, driver and vehicle information) in order to determine the current location of the service providers, the speed and direction in which the service provider is moving, whether a service provider is currently providing a transport service (e.g., is currently occupied), etc., and other service provider information. The on-demand service application can receive information about one or more service providers in the vicinity of the user's current location or pickup location in order to provide real-time information to the user.

For example, based on the selected vehicle type and determined region, one or more graphic vehicle indicators 315 (if any) can be dynamically provided on the map to indicate to the user the current/real-time locations and movements of the service providers having the selected vehicle type. The graphic vehicle indicators 315 can indicate to the user that the driver is currently available to service the user and is within the region or portion of the region in which the user's current location or pickup location is located in. In the example illustrated in FIG. 3C, the user has selected Sedan vehicles as the vehicle type in which he or she would like to potentially request a transport service. The map can display graphic vehicle indicators 315 that visually represent Sedan vehicles that are near the current location or pickup location of the user. If the user changes the vehicle selection using the multistate selection feature 320 to select SUVs, the graphic vehicle indicators 315 of the Sedans can be removed from the map and one or more graphic vehicle indicators 315 (if any) of SUVs can be provided on the map.

In one implementation, one or more graphic vehicle indicators 315 can move on the map corresponding to the real-time and real-life movements of the service providers' vehicles relative to the user's current location or pickup location. The movements of the graphic vehicle indicators 315 can be determined using provider data (e.g., via provider information 173 transmitted by the transport service system in FIG. 1) that includes GPS data of the drivers' vehicles.

In one example, the transport service system can also use one or more databases of streets and roads for maps (e.g., including external databases maintained by third parties or other map sources) to determine how the graphic vehicle indicators 315 can be oriented and moved on a map that is presented to the user (e.g., as part of the home page user interface 300a). The one or more databases can include geocoding information that make up individual streets and roads. By taking the GPS points or coordinates of available vehicles (from the service providers' devices) and drawing lines between the points, the GPS points and lines can be aligned with the geocoding information from the databases. In this manner, real-time vehicle movements and locations can be correlated to maps of streets and roads so that the graphic vehicle indicators 315 can be displayed to the user. In addition, by map-fitting the GPS points with the known geolocations of streets, the transport service system can correct for inconsistencies and smooth out lines between GPS points so that the corresponding graphic vehicle indicators 315 can be accurately displayed on a map to the user on the user's computing device (e.g., on user interface 300a).

The graphic vehicle indicators 315 can then be oriented and aligned in the appropriate directions on the appropriate streets so that the user can easily determine the locations and directions of movement of nearby service provider vehicles, and determine what side of the street the service provider vehicles are on.

In some implementations, when the user makes a selection of a vehicle type using the multistate selection feature 320, a summary user interface 350a can be presented to the user. As illustrated in FIG. 3D, the summary user interface 350a can overlay the previously displayed user interface feature, such as the home page user interface 300a, so that a portion of the previously displayed user interface feature can be continued to be displayed to the user. For example, the summary user interface 350a can include a summary panel 360 that is displayed over the previously displayed user interface feature, such as the home page user interface 300a. In some examples, the summary panel 360 can be presented concurrently with the multistate selection feature 320. In other variations, a semi-transparent shading 370 can overlay a portion of the previously displayed user interface feature so that the user can continue to view information provided on portions of the previously displayed user interface.

The summary panel 360 can include a variety of information related to a transport service that is specific to the locality (e.g., the region) of the user and the selected vehicle type. The summary panel 360 can include an estimated time of arrival (ETA) section 361, an average fare section 363, and a maximum capacity section 365, that each include dynamically provided content that is location-specific (e.g., region-specific) and vehicle-specific. Each of the sections can also include a graphic to represent the corresponding content (e.g., a watch or clock, a receipt or ticket, person). Because the available service providers continue to drive around the region, pick up other customers, make traffic stops, etc., the information provided within the sections 361, 363, 365 can also be dynamically adjusted based on the real-time conditions of the service providers (e.g., the estimated time of arrival can be decreased or increased, or the average estimated fare can be adjusted).

In addition, the location-specific information is based on the selected vehicle type, when the user changes the selection of a vehicle type, the information provided within the sections 361, 363, 365 can be dynamically adjusted. For example, when the summary panel 360 is presented concurrently with the multistate selection feature 320 on the summary user interface 350a, the user can also move the slider feature 322 to select different vehicle types and cause the content within the sections 361, 363, 365 to change accordingly. The maximum capacity of an SUV or Van can be more than four, for example, compared to a Sedan, which can be three, and the closest SUV or Van can be much further away than a Sedan, which can cause the estimated time of arrival to be altered. In another example, a Sedan can be cheaper than an SUV in the user's current region, so that the average estimated fare can be dynamically decreased in cost.

The user can also select a completion feature 367 when he or she has finished viewing the information corresponding to the selected vehicle type. Selecting the completion feature 367 can close the summary user interface 350a to remove the summary panel 360. In other examples, selecting other portions of the summary user interface 350a (e.g., selecting on a region of the semi-transparent shading 370) can cause the summary user interface 350a to be closed (e.g., no longer presented to the user). When the user is done selecting the vehicle type, other user interface features can be provided to enable the user to request the transport service.

The transport application can also provide transport specific information to the user using languages, symbols, and/or prices based on the user's location. For example, the different vehicle types displayed in the multistate selection feature 320 can be identified in French, German, Spanish, etc., based on the country the user operates the transportation application in (e.g., instead of "Sedan" or "Any"). A user can choose to have information provided by the transport application in a particular language (e.g., select a language for the application), such as when first installing the transport application or by selecting a language when first registering the user's device, etc. The user is also free to change languages upon his or her preference.

In another example, the content within the sections 361, 363, 365 of the summary user interface 350a can also be provided in a language selected by the user and/or based on the user's location. If the user was currently in London, England, for example, the average fare section 363 would display the average cost for the selected vehicle type in pounds (GBP) instead of dollars (USD). This enables the transport application to provide text information in a language selected by the user, while at the same time, tailor the content based on the user's location. For example, the user can prefer to operate the transport application in French, while living in London, England. The text information can be provided by the transport application in French, yet continue to provide content based on standards used in England (e.g., provide average fare information in pounds).

Figure 3F:
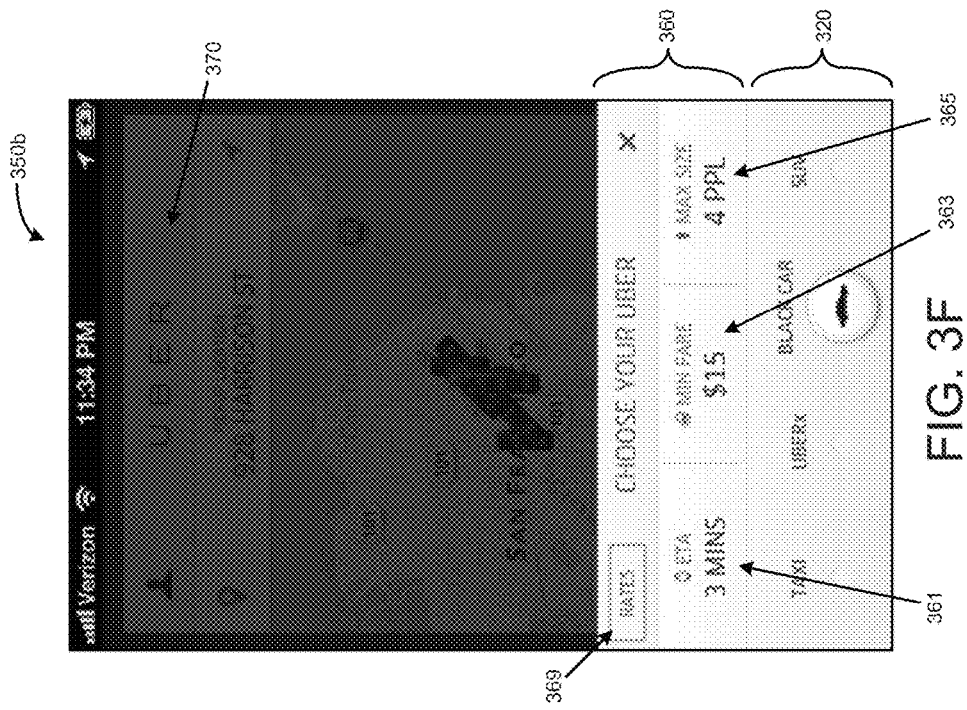
Figure 3E:
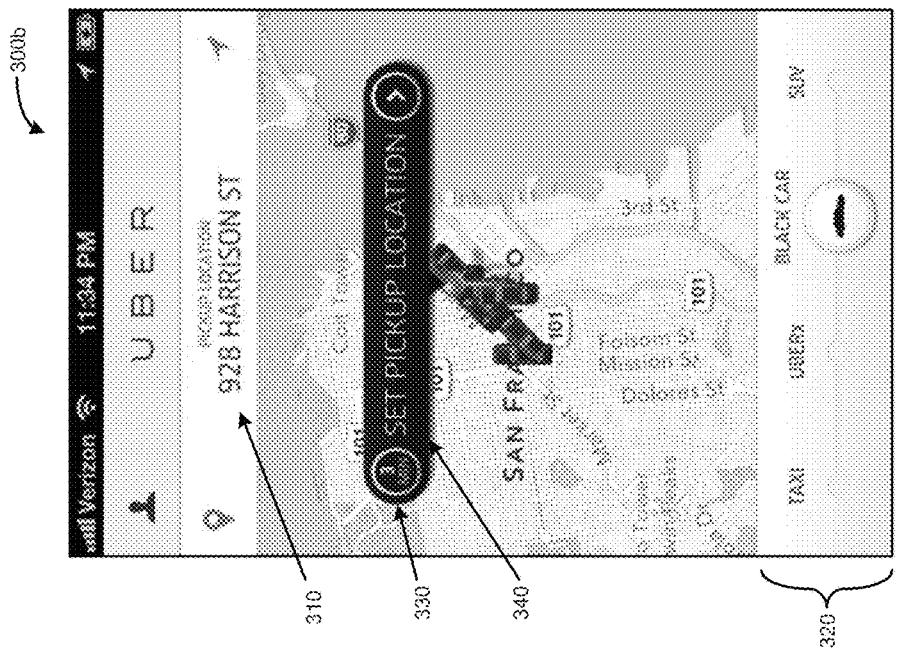

FIG. 3E illustrates another example of a home page user interface or request user interface 300b. A user can interact with the home page user interface 300b, such as the request selection feature 340, in order to request a service (e.g., a transport service). The home page user interface 300b can have a similar layout as the layout of the home page user interface 300a illustrated in FIG. 3C, but have some differences. For example, in the home page user interface 300b, only four types of available service options are displayed on a multistate selection feature 320.

FIG. 3F illustrates another example of a summary user interface 350b. The summary user interface 350b can have a similar layout at the layout of the summary user interface 350a illustrated in FIG. 3D. In one example, the summary panel 360 can display information related to a transport service that is specific to the locality (e.g., the region) of the user and the selected vehicle type (e.g., "Black Car"). In addition to an estimated time of arrival (ETA) section 361, an average fare section 363, and a maximum capacity section 365, the summary panel 360 can also include a selectable fare feature 369 that can display additional or detailed information about the fare.

Figure 3G:

As an addition or alternative, the home page user interface 380 of FIG. 3G can also be provided by the transport application. The home page user interface 380 can correspond to a transition interface that is displayed while content in the request selection feature 340 is being updated or modified. For example, while the transport application is initially loading or is processing information as a result of user input (e.g., manipulation of slider feature 322), different graphics/text can be provided within the request selection feature 340 and/or the estimated time of arrival 330.

The home page user interface 380 (and other user interfaces for other on-demand services as described in FIGS. 1-3F) can also include a price adjustment (or surge pricing) selectable feature 381. In some implementations, the transport service system can dynamically adjust the price for transport service in a given region based on real-time conditions. Based on real-time conditions, such as the high (or low) demand of transport service requests or the high (or low) supply of available transport service providers, the transport service system can increase or decrease the price for the transport service in that region. When the transport service system determines that prices are to be altered, the price adjustment feature 381 can be provided to a user interface feature, such as the home page user interfaces 300a, 300b, 380.

When user selects the price adjustment feature 381, informational content about the adjusted pricing can be presented to the user. For example, the user can be notified of the price adjustment, how much the price is being adjusted, why the price is being adjusted, etc., to provide the user with full disclosure before the user agrees to request the service at that price. In some variations, a price adjustment icon 383 can be provided with one or more vehicle types in a user's region to inform the user which particular vehicles are subject to the price adjustment. Dynamic price adjustment is described in U.S. Provisional Patent Application No. 61/612,471, filed Mar. 19, 2012 (the aforementioned application being incorporated by reference in its entirety).

The home page user interface 380 can also include a promotional selection feature 391. The promotional selection feature 391 can be selected by a user to view dynamically provided promotional content that the user can view and request when requesting the transport service. Promotional content is further described with FIGS. 7A-7D below.

Figure 3H:

FIG. 3H illustrates another example of a user interface feature that can be displayed by an on-demand service application. In some examples, the user interface 395 can be displayed by the on-demand service application in response to a user interacting with a previously displayed user interface (e.g., such as the user interfaces 300a, 300b, 350a, 350b, 380, 500 of FIG. 5A, etc.) The user interface 395 displays a full screen (or close to full screen) view of an expanded map 396 that provides information about the user's location (marked by a graphic pin, such as the graphic pin 313 of FIG. 3C) as well as one or more graphic vehicle indicators that are dynamically provided on the map 396 to indicate the current/real-time locations and movements of the available service providers.

The user interface 395 can be presented with an expanded map 396 that has been expanded to fit the size of a display screen of the computing device in response to a user selection. The user selection can correspond to, for example, the user interacting with (e.g., tapping, tapping and holding, or double tapping, etc.) a portion of a map of a previously displayed user interface. For example, if the user interface 380 of FIG. 3G is presented to the user and the user provides an input to cause the map to be expanded, the map can expand from a first size (e.g., from the window size in FIG. 3G) to a second size (e.g., to the size in FIG. 3H). In this manner, the user can see a full view of the general region, such as where the user is, the nearby service providers, etc., before committing to request the service. In some variations, a graphical transition can be provided to show the transition between the map in a previously displayed user interface to the expanded map 396 in the user interface 395.

The user interface 395 can also include a reduce feature 397 that can be selectable in order to return the map to a previous size and re-display the previously displayed user interface feature. In some cases, the graphic transition can show the transition of the expanded map 396 reducing in size from the larger size to a smaller size, such as the map in FIG. 3G. The user can then again view the different options, such as the multistate selection feature 320 of FIG. 3G. In another example, the user interface 395 can be displayed in response to the user interacting with the map of the confirmation user interface 500 of FIG. 5A. Selecting the reduce feature 397 would then cause the confirmation user interface 500 to be re-displayed so that the user can view the information before confirming the request.

Figure 4B:
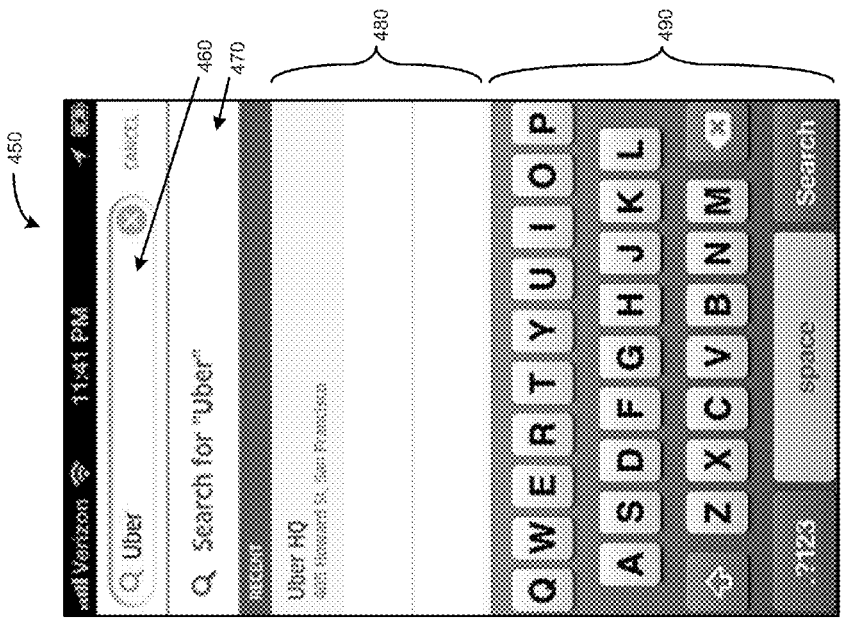
FIGS. 4A-4C illustrate examples of user interfaces that are displayed to a user to enable the user to select a pickup location for an on-demand service, under another embodiment.
Figure 4A:
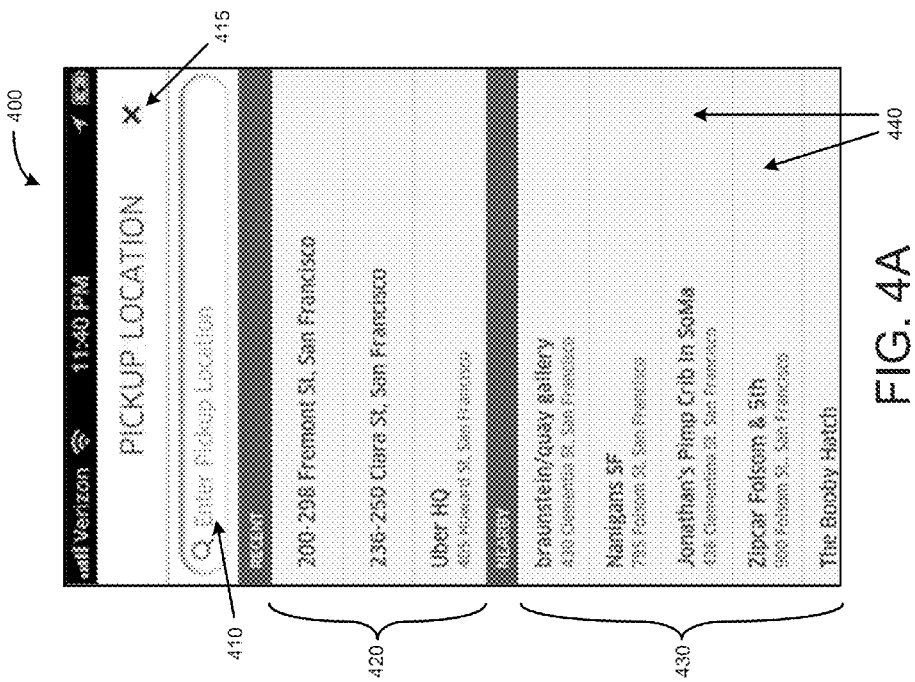
Figure 4C:
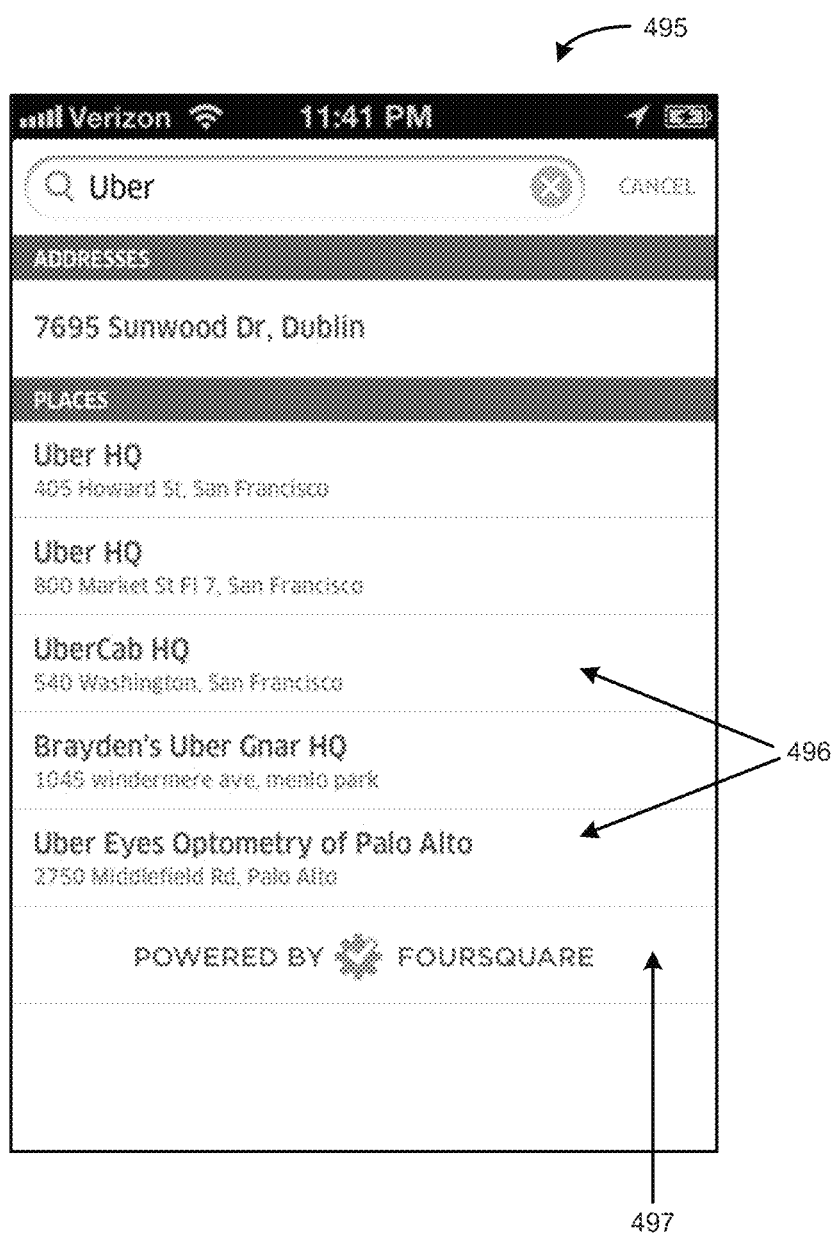

FIGS. 4A-4C illustrate examples of user interfaces that are displayed to a user to enable the user to select a service location for an on-demand service, under another embodiment. In some variations, the location suggestion user interface 400, and/or the location search user interfaces 450, 495 illustrate user interfaces that can be provided by the on-demand service application in response to the user requesting to make a manual selection of a service location.

The location suggestion user interface 400 enables a user to select particular locations, such as stores, restaurants, parks, venues, etc., that can be precisely and easily identified by a service provider when the user requests to have the on-demand service be performed or fulfilled. For example, the user can select the location at which the user would like his or her food to be delivered at (e.g., the user's office or home, or a friend's apartment, etc.) or the location where the mariachi band should play at (e.g., at a bar or restaurant). In another example, referring back to FIG. 3E, when accessing a transport service application, the user can select the pickup location identifier 310 in order to view suggestions 430 of various locations and venues that are located in the vicinity of the user's current location. If the user is at Nanigans SF, for example, and would like to be picked up there, the user can select the entry 440 for Nanigans SF as the pickup location for the transport service. Once the user makes the selection, the pickup location identifier 310 of FIG. 3E can identify the pickup location to be Nanigans SF.

In some implementations, other suggested entries 440 can be provided based on historical/previous pickup locations of the user and/or based on user-specific data. Based on the current location of the computing device, the on-demand service application can access user information that includes previously requested services and/or personal user information (e.g., the user's home address, the user's place of business, the user's preferences) to provide one or more user-based location entries 420, 440. Historical information, such as the frequency or recency of previous service locations that the user requested service to be performed at, can be used to provide recent and/or recommended points of interest to the user.

In this manner, the on-demand service application can predict what particular service locations the user would like to select. The one or more suggested entries 440 can be displayed based on a combination of the user's current location (e.g., the nearness of service locations) and the recency of previous service locations and/or the total frequency of particular service locations. In some examples, the suggested locations can also be ranked based on the scores of the suggested locations determined using a recency, frequency, or nearness algorithm. The user can also select the search field 410 in order to search for other locations or venues that are not listed in the suggestions 420, 430. A cancellation feature 415 can be selected by the user to close the location suggestion user interface 400 and request service at the location already determined and identified on a location identifier (such as the pickup location identifier 310 of FIGS. 3C, 3E).

The location search user interface 450 of FIG. 4B enables the user to manually provide input (e.g., such as at least portions of an address, a name of a store, a street name, a city, etc.) in the search field 460 to search for particular locations, stores, buildings, or venues to select as a service location. In one implementation, the on-demand service application can communicate, via APIs, with one or more other applications or programs to display a keyboard 490 as part of the location search user interface 450. As the user inputs characters in the search field 460, entries 480 can be provided that match (at least in portion) the characters provided in the search field 460. The user can also select the "search" feature 470 to cause the on-demand service application to perform a search (e.g., of one or more internal and external location or map databases of the on-demand service system) using the search term or characters provided in the search field 460 as the search query. The search results 496 can be provided on the location search user interface 495 of FIG. 4C for user selection. In some variations, the location search user interface 495 can also display a feature 497 that identifies one or more sources that were queried to determine the search results 496.

Figure 5A:
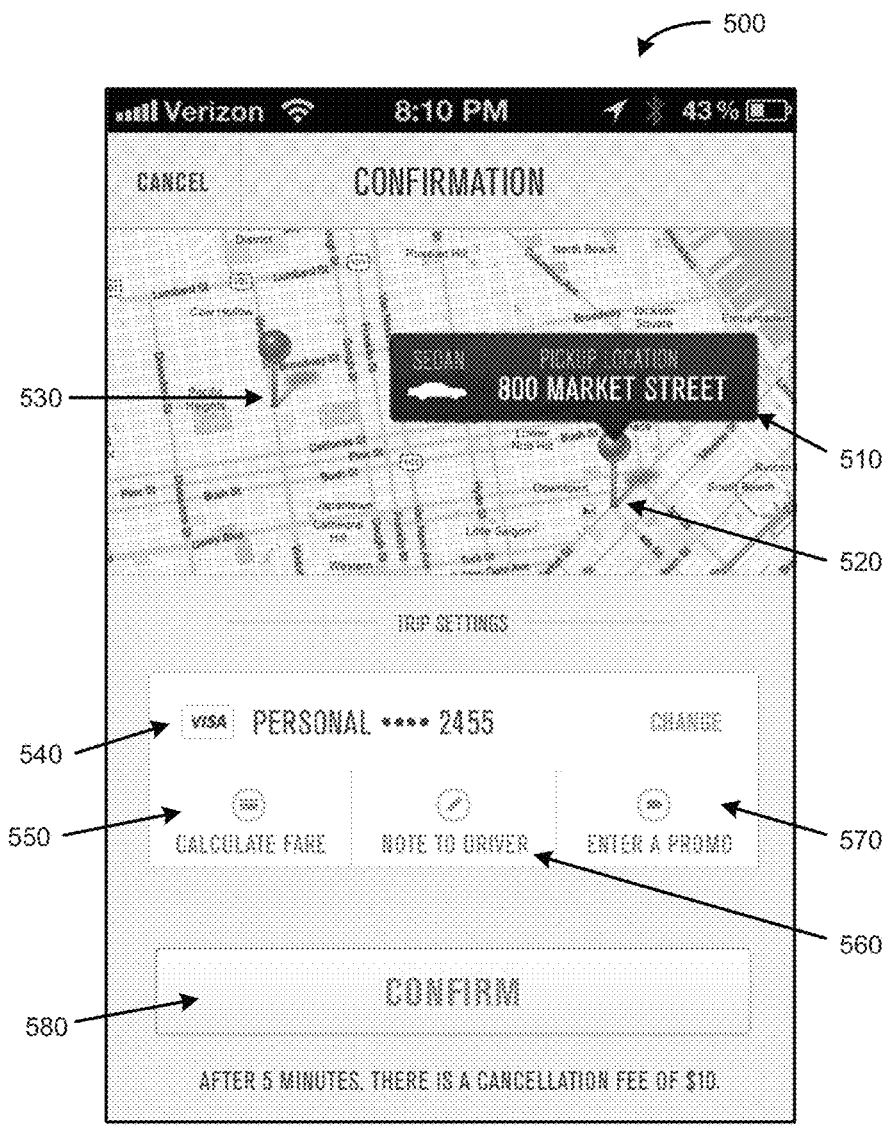
FIGS. 5A-5B illustrate examples of confirmation user interfaces that are displayed to a user when an on-demand service has been requested, according to an embodiment.
Figure 5B:
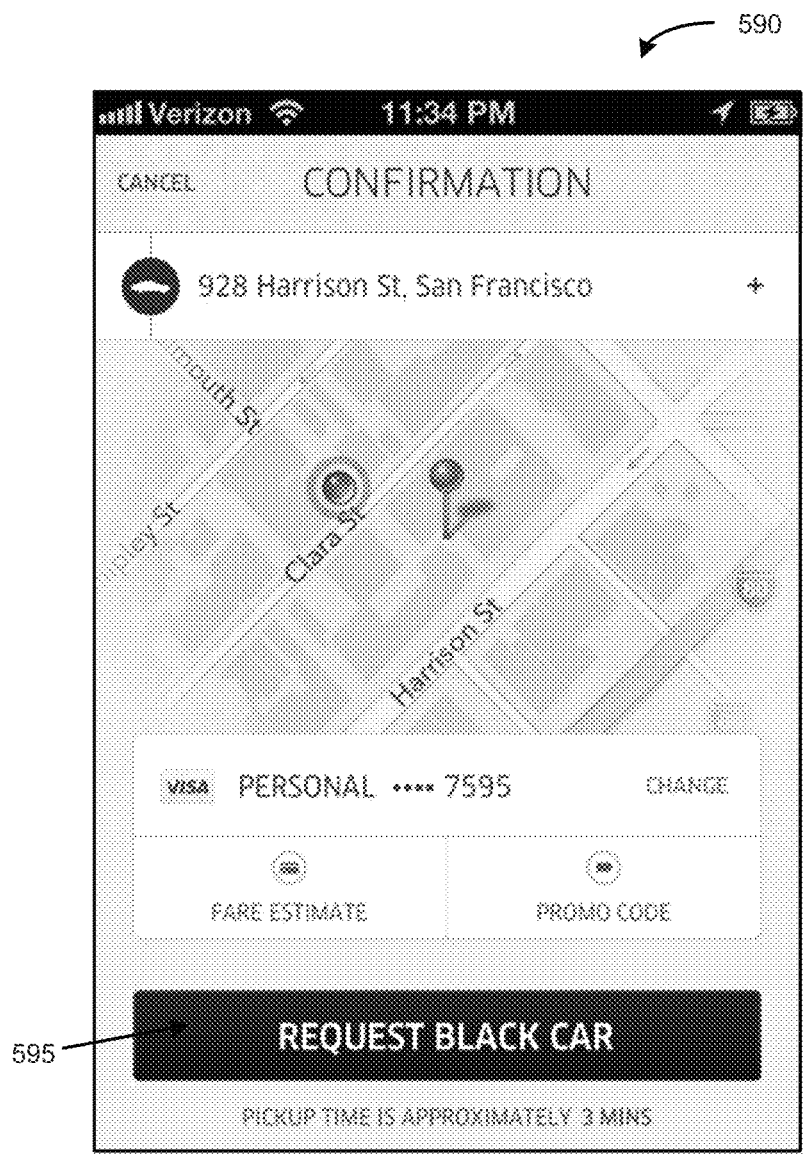

FIGS. 5A-5B illustrate examples of confirmation user interfaces that are displayed to a user when an on-demand service has been requested, according to an embodiment. For example, the confirmation user interface 500 of FIG. 5A can illustrate a user interface that is provided by a transport service application in response to the user requesting a transport service. After the user selects a vehicle type, the user can request the transport service by selecting the request selection feature 340 of FIGS. 3C, 3E. Similarly, a confirmation user interface can be provided in response to the user requesting other on-demand services using other respective on-demand service applications.

A confirmation user interface 500 can provide a variety of information that the user can confirm before the on-demand service system arranges the on-demand service for the user. Referring back to the transport service example, the confirmation user interface 500 can include a pickup location marker 520 and a pickup location panel 510 that identifies the selected vehicle type (e.g., Sedan) as a graphic and/or text, and the pickup location (e.g., automatically determined from the current user location or determined from user selections). The confirmation user interface 500 can also include additional features, such as markers 530 (a marker identifying the destination, if selected by a user via a user interface, or a marker identifying the current location of the driver that is to provide the transport service). As another example, if the user is requesting an ice cream truck, the confirmation user interface 500 can include a service destination marker, a current ice cream truck location marker, and other additional information.

The confirmation user interface 500 can also provide the user's financial account information 540 (e.g., a bank routing and/or account number, a credit card number, etc.) that is used to pay for the requested on-demand service. The user can have the option to use a different account to pay for the service if he or she prefers. In some variations, the confirmation user interface 500 can also provide selectable features 550, 560, 570 for calculating the price or fare, providing a specific note or additional information to the driver, and for entering a promotional code to receive discounts or other promotional services.

Once the user views the information provided, the user can select the confirmation feature 580 to confirm the requested on-demand service. The on-demand service system can then receive appropriate information from the on-demand service application, charge the account, communicate with available service providers in the vicinity of the user's service location, arrange the on-demand service between the user and a driver, and/or provide a transaction confirmation or receipt to the user. If the information provided on the confirmation user interface 500 is incorrect, or the user wishes to cancel the request for whatever reason, the user can simply select the "cancel" feature to change the service options and/or the service location.

FIG. 5B illustrates another example of a confirmation user interface 590. The confirmation user interface 590 can present similar information to that of the confirmation user interface 500 of FIG. 5A, but arranged in a different manner. For example, instead of displaying a pickup location panel 510 (e.g., as displayed in FIG. 5A), the confirmation user interface 590 can simply provide a pin representing the user's location and/or the pick up or drop off location on the map itself.

The confirmation user interface 590 can also enable a user to correct or after a pick up location or drop off location without having to backtrack or return to previously displayed user interfaces (e.g., user interfaces for requesting a service or for searching for a location). The user can, for example, interact with the service location identifier and/or the displayed map in order to change a service location. A user can also interact directly with the displayed map of the confirmation user interface 590 in order to dynamically adjust the displayed portion of the map (e.g., pan, zoom in, zoom out). The user can zoom in/out and/or pan the map in one or more directions, for example, to see the closest available service provider(s) or the overall geography (streets, freeways, locations of interest, etc.) of the region. In this manner, the confirmation user interface 590 can dynamically display different portions of the map based on user preference.

In some implementations, the confirmation user interface 590 can include a confirmation feature 595 that dynamically alters its text (e.g., its content within the selectable feature) based on the user selections for the service. For example, instead of the text "confirm" within the confirmation feature 580, the confirmation feature 595 can specify "request black car" or "request sedan," etc., based on the user selected request. Despite the different variations or layouts, the confirmation user interfaces 500, 590 can display information about the user's requested service in a clear and informative manner on a single panel.

Figure 6B:
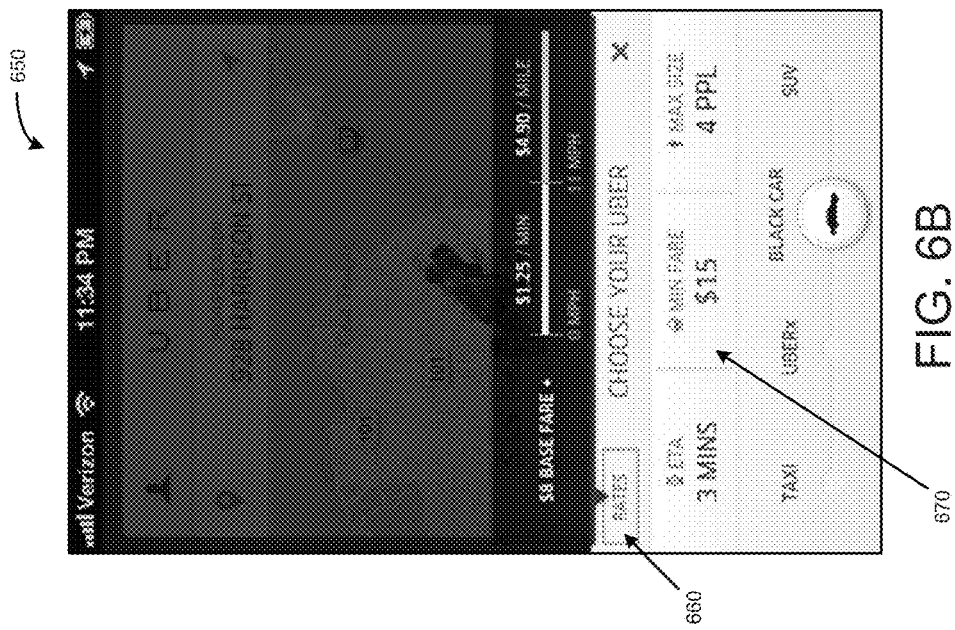
FIGS. 6A-6B illustrate examples of fare information panels that provide additional information about a fare for an on-demand service, under an embodiment.
Figure 6A:
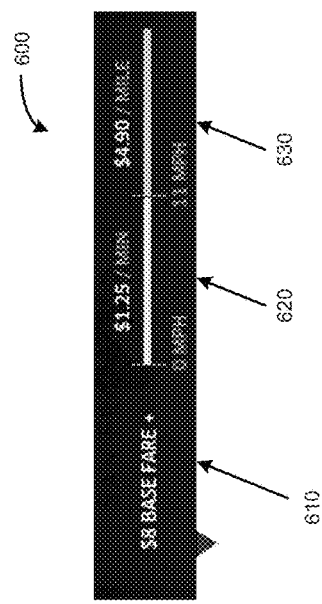

FIGS. 6A-6B illustrate examples of fare information panels that provide additional information about a fare for an on-demand service, under an embodiment. In FIG. 6A, a fare information panel 600 can be generated and displayed as part of a user interface to provide more detailed fare information to a user (e.g., for a transport service). The fare information panel 600 can be a pop up, for example, in response to a user input for viewing additional fare information. The fare information panel 600 can include information about the base fare 610, the cost or fare per minute 620 in situations when the average speed is between 0 miles per hour (e.g., the vehicle is stopped) and 11 mph, and the cost or fare per mile 630 in situations when the average speed is higher than 11 mph. Such information can be provided with a visual chart or graph to enable the user to easily understand the fare amounts for the service.

The detailed information provided in the fare information panel 600 can identify an estimated or anticipated fare for the service, or can identify the actual fare that a service provider abides by. The detailed information can be adjusted depending the user's location (e.g., the user's current location, the pickup location and/or destination location, etc.) and the user's selected service option. For example, for a transport service or a delivery service, the determined fares 610, 620, 630 can be adjusted depending on the type of vehicle the user has selected (e.g., via the multistate selection panel). In other examples, the threshold levels for the fares can be adjusted depending on the user's location or the service option (e.g., instead of 11 mph, increased to 13 mph).

FIG. 6B illustrates an example of the fare information panel 600 as provided with a user interface of an on-demand service application. Although the fare information panel 600 is displayed with a summary panel and a multistate selection feature in the example of FIG. 6B, the fare information panel 600 can be provided on other user interfaces, such as with the confirmation user interfaces of FIGS. 5A-5B. The user interface feature 650 illustrates the fare information panel 600 being displayed as a result of the user selecting the selectable fare feature 660 (e.g., "rates"). In other examples, the user can select other features, such as the average fare section 670 of the summary panel or the "calculate fare" or "fare estimate" features of the confirmation user interfaces, in order to cause the fare information panel 600 to be provided (as a pop up, for example) on the user interface 650. In some examples, the fare information panel 600 can be located and displayed proximate to or near the feature selected by the user. By providing a fare information panel 600, the user can see a comprehensive view of the costs for a service before making the decision to request the service using the on-demand service application.

FIGS. 7A-7D illustrate an example series of user interfaces that are displayed to a user to provide additional content, under an embodiment. In some examples, FIGS. 7A-7D can illustrate a graphical transition between user interface features that occur in a short period of time (e.g., milliseconds, a second, etc.). The user interfaces of FIGS. 7A-7D correspond to interfaces that are provided by an on-demand transport application, but features described in FIGS. 7A-7D can also be provided by other on-demand service applications (e.g., applications that can enable the user to request other on-demand services).

Figure 7B:
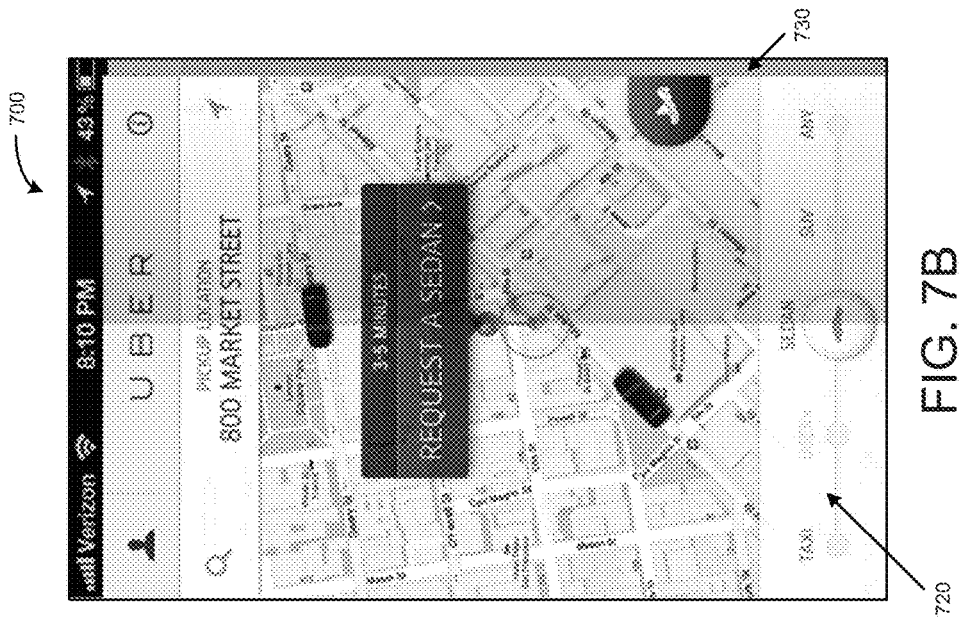
FIGS. 7A-7D illustrate an example series of user interfaces that are displayed to a user to provide additional content for various on-demand services, under an embodiment.
Figure 7A:
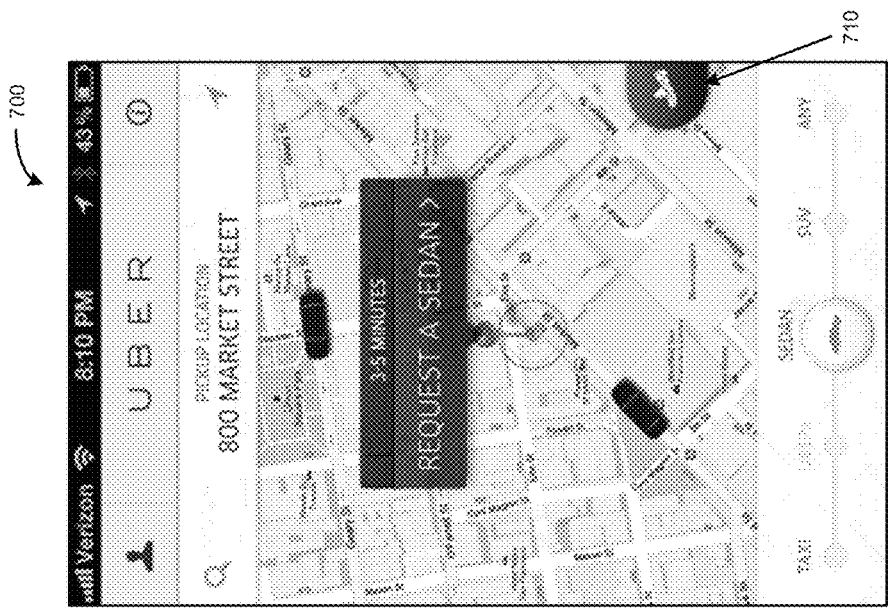

In FIG. 7A, a user interface feature 700 for requesting an on-demand service is presented on a display of the user's computing device. Such a user interface feature 700 can include any one of the user interface features described in FIGS. 1-6B. In one example, the user interface feature 700 can include a promotional selection feature 710. The on-demand service system can dynamically provide promotions or specials, for example, to the user that the user can request or order when requesting the on-demand service. When the user selects the promotional selection feature 710, promotional content can be presented to the user. The user can then order or request the promotional service, for example, as part of the on-demand service request (e.g., the user gets a discount on the current price or future request, a free dessert, a coupon, etc.).

Figure 7C:
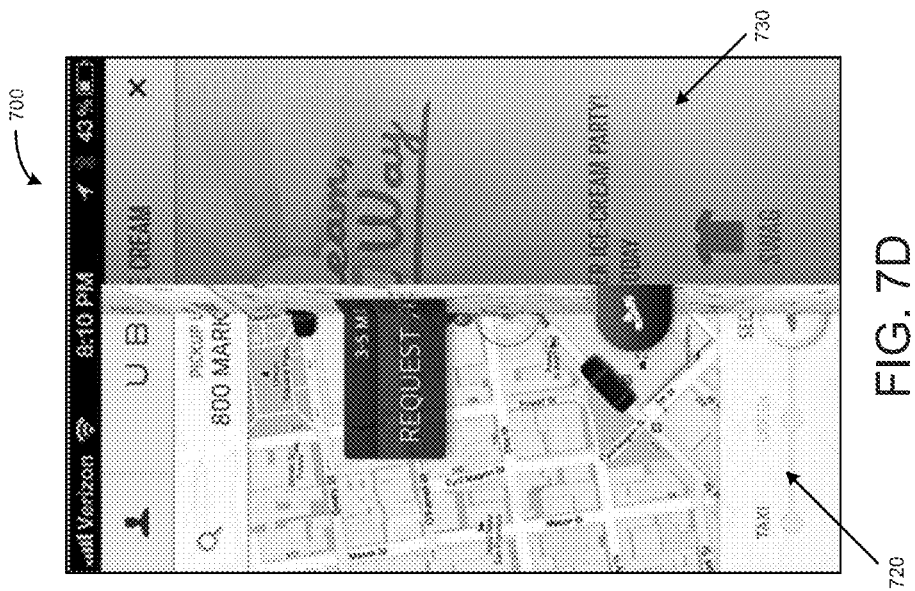
Figure 7D:
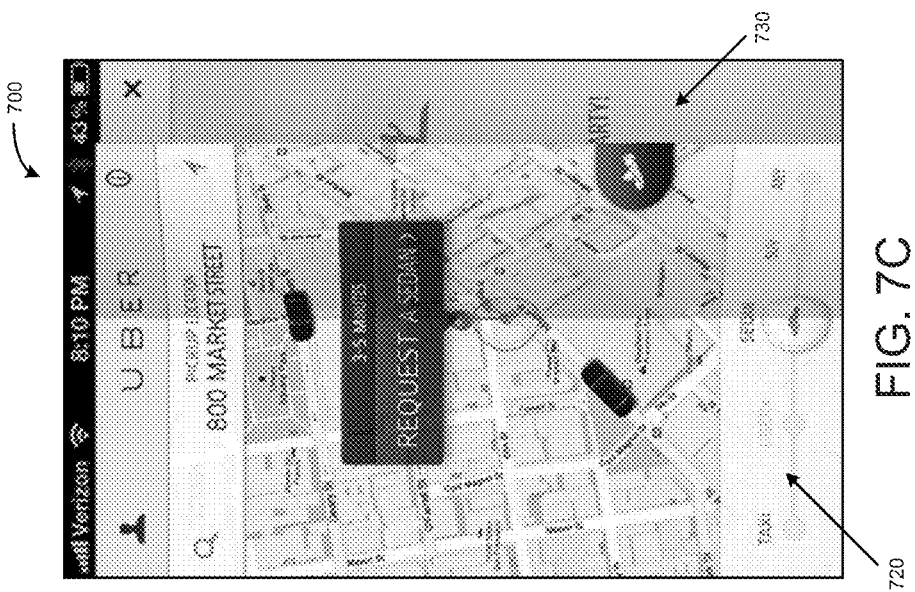

FIGS. 7B-7D illustrate the user interface feature 700 after the user has selected the promotional selection feature 710. The user interface features 700 in FIGS. 7B-7D depict a graphical transition to transition between the initially displayed user interface feature 720 and a different user interface feature 730. In one example, the graphic transition can represent a page flip or a page fold. In other examples, the graphical transition can include wrinkling, (like the wrinkling of an accordion), sliding away of the initially displayed user interface feature 720 and/or sliding in of the new user interface feature 730, pulling up or pulling down of a user interface feature (like the pulling of a curtain or window blinds, or sliding of a pocket door), or other graphical transitions or combinations of graphical transitions.

Once the subsequent user interface feature 730, such as a promotional user interface, is provided, the user can view the information displayed and navigate back to the previous (or different) user interface (e.g., back to a home page user interface or confirmation user interface, etc.).

As an addition or alternative, the graphical transitions described with respect to FIGS. 7A-7D can be used to transition between any of the user interface features described in FIGS. 1-6B. For example, referring back to FIG. 3C or 3E, if the user selects the "profile" feature (identified by the image of a person) or "information" feature (identified by an "i" inside a circle), a profile menu or an information menu, respectively, can be pulled down to overlay a portion of the displayed user interface feature (e.g., the home page user interfaces 300a, 300b). The graphical transition can provide a seamless transition between the displayed user interface feature and the pulled-down profile menu or the information menu that overlays, the map, for example, while continuing to display the multistate selection feature 320. In another example, graphical transitions, such as a pulling of or pushing of a user interface or a user interface feature, can be displayed when the user selects a price adjustment feature 381 of FIG. 3G.

Still further, a graphical transition can include a visual expansion (from a first size to a second larger size, for example) of a feature on a user interface and/or a visual reduction of a feature. Referring to FIGS. 3C and 3H, for example, an input by a user to expand the map that is displayed with the user interface 300a of FIG. 3C can cause a visual expansion of the map from the manner displayed in the user interface 300a to a full size image of the map as displayed in the user interface 395 of FIG. 3H. Similarly, a user input selecting the reduce feature 397 of the user interface 395 can cause a visual reduction from the full size image of the map 396 to the previous size of the previous user interface feature. In some variations, the pull down menus can be semi-transparent to continue to display the overlaid portions of the user interface feature in the background.

Hardware Diagrams

Figure 8:
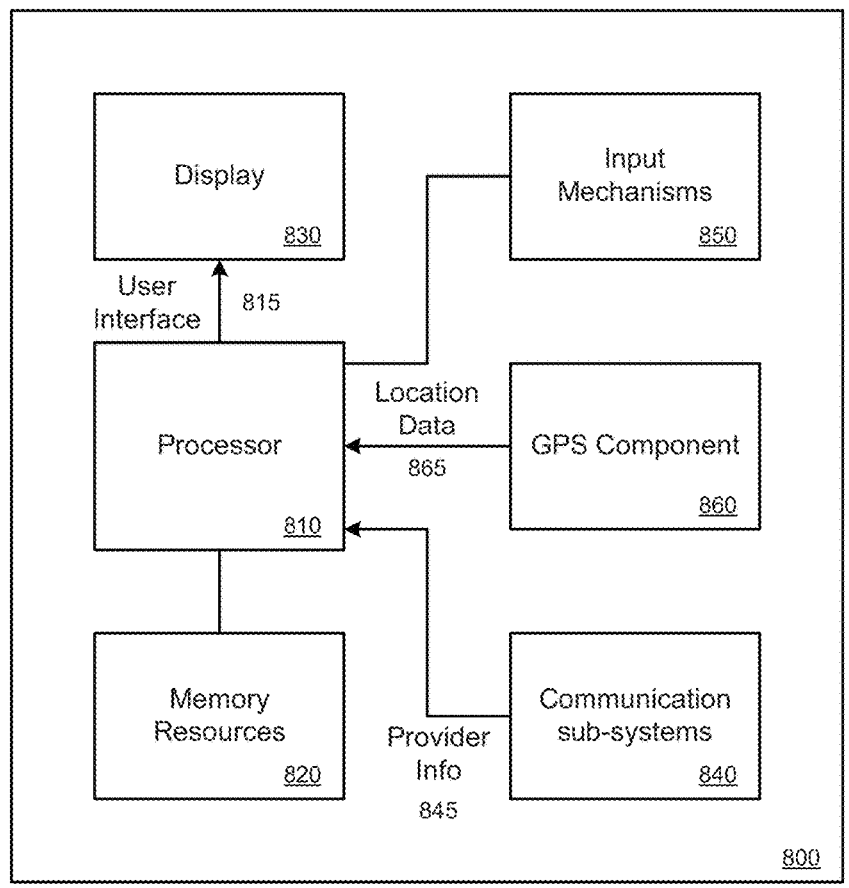
FIG. 8 is a block diagram that illustrates a mobile computing device upon which embodiments described herein may be implemented.

FIG. 8 is a block diagram that illustrates a mobile computing device upon which embodiments described herein may be implemented. In one embodiment, a computing device 800 may correspond to a mobile computing device, such as a cellular device that is capable of telephony, messaging, and data services. Examples of such devices include smartphones, handsets or tablet devices for cellular carriers. Computing device 800 includes a processor 810, memory resources 820, a display device 830 (e.g., such as a touch-sensitive display device), one or more communication sub-systems 840 (including wireless communication sub-systems), input mechanisms 850 (e.g., an input mechanism can include or be part of the touch-sensitive display device), and one or more location detection mechanisms (e.g., GPS component) 860. In one example, at least one of the communication sub-systems 840 sends and receives cellular data over data channels and voice channels.

The processor 810 is configured with software and/or other logic to perform one or more processes, steps and other functions described with implementations, such as described by FIGS. 1-7D, and elsewhere in the application. Processor 810 is configured, with instructions and data stored in the memory resources 820, to operate an on-demand service application as described in FIGS. 1-7D. For example, instructions for operating the service application to display various user interfaces, such as described in FIGS. 3A-7D, can be stored in the memory resources 820 of the computing device 800. In one implementation, a user can operate the on-demand service application so that location data 865 can be received by the GPS component 860. The location data 865 can be used by the application to present user interface features that are made specific to the current location of the computing device 800.

The location data 865 can also be provided to the on-demand service system using the communication sub-systems 840. The communication sub-systems 840 can enable the computing device 800 to communicate with other servers and computing devices, for example, over a network (e.g., wirelessly or using a wire). The location data 865 can be communicated to the on-demand service system so that when the user requests the on-demand service, the system can arrange the service between the user and an available service provider. The communication sub-systems 840 can also receive provider information 845 (such as location and/or movement information of drivers in real-time) from the on-demand service system and transmit the provider information 845 to the processor 810 for displaying driver data on one or more user interfaces 815.

The processor 810 can cause user interface features to be presented on the display 830 by executing instructions and/or applications that are stored in the memory resources 820. In some examples, user interfaces 815, such as user interfaces described with respect to FIGS. 3A-7D, can be provided by the processor 810 based on user input and/or selections received from the user. In some implementations, the user can interact with the touch-sensitive display 830 to make selections on the different user interface features 815 so that region-specific information (that is based on the user selections) can be provided with the user interface features 815. While FIG. 8 is illustrated for a mobile computing device, one or more embodiments may be implemented on other types of devices, including full-functional computers, such as laptops and desktops (e.g., PC).

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for providing information about an on-demand service, the method being performed by one or more processors of a computing device and comprising:

determining a current location of the computing device based on location information obtained from the computing device;

providing, on a display of the computing device, a multistate selection feature that is operative to display information about multiple types of services that are available through an on-demand service at the current location of the computing device, the multistate selection feature being responsive to an input of a user along at least one bidirectional path to transition between at least a first state that is associated with a first type of transport service of the multiple types of services, and a second state that is associated with a second type of transport service of the multiple types of services;

obtaining location-specific service information based on the current location of the computing device, the location-specific service information including location-specific first service information for the first type of transport service, and location-specific second service information for the second type of transport service;

wherein providing the multistate selection feature includes:

when the multistate selection feature is in the first state, displaying (i) the multistate selection feature to include a first graphic indicator of a first vehicle type to represent the first type of transport service, and (ii) concurrently, with the first graphic indicator, the location-specific first service information;

when the multistate selection feature is in the second state, displaying (i) the multistate selection feature to include a second graphic indicator of a second vehicle type to represent the second type of transport service, and (ii) concurrently, with the second graphic indicator, the location-specific second service information; and in response to the input of the user along the at least one bidirectional path, (i) moving the first graphic indicator of the first vehicle type along the at least one bidirectional path, (ii) replacing the first graphic indicator of the first vehicle type with the second graphic indicator of the second vehicle type, and (iii) replacing the location-specific first service information with the location-specific second service information.

2. The method of claim 1, wherein at least one of the location-specific first service information or the location-specific second service information is further based on a size or capacity of the respective first or second vehicle type.

3. The method of claim 1, wherein the location-specific first service information identifies pricing information that is specific to the first vehicle type and the location-specific second service information identifies pricing that is specific to the second vehicle type.

4. The method of claim 1, wherein at least one of the location-specific first service information includes location information for one or more providers of the first vehicle type or the location-specific second service information includes location information for one or more providers of the second vehicle type.

5. The method of claim 1, wherein the location-specific service information is obtained from a network service.

6. The method of claim 1, wherein displaying the multistate selection feature to include the location-specific first service information includes using a first panel of multiple panels, and displaying the multistate selection feature to include the location-specific second service information includes using a second panel of the multiple panels.

7. The method claim 1, wherein the multistate selection feature includes a slider that is moveable along a track between at least the first state and the second state.

8. The method of claim 1, wherein the location-specific first service information includes an estimated time of arrival of the first vehicle type, and the location-specific second service information includes an estimated time of arrival of the second vehicle type.

9. The method of claim 1, wherein the method is performed on the computing device using instructions and data communicated from a network service.

10. A non-transitory computer-readable medium storing instructions that, when executed by one or more processors of a computing device, cause the computing device to:
determine a current location of the computing device based on location information obtained form the computing device;
provide, on a display of the computing device, a multistate selection feature that is operative to display information about multiple types of services that are available through an on-demand service at the current location of the computing device, the multistate selection feature being responsive to an input of a user along at least one bidirectional path to transition between at least a first state that is associated with a first type of transport service of the multiple types of services, and a second state that is associated with a second type of transport service of the multiple types of services;
obtain location-specific service information based on the current location of the computing device, the location-specific service information including location-specific first service information for the first type of transport service, and location-specific second service information for the second type of transport service;
wherein providing the multistate selection feature includes:
when the multistate selection feature is in the first state, display (i) the multistate selection feature to include a first graphic indicator of a first vehicle type to represent the first type of transport service, and (ii) concurrently, with the first graphic indicator, the location-specific first service information;
when the multistate selection feature is in the second state, display (i) the multistate selection feature to include a second graphic indicator of a second vehicle type to represent the second type of transport service, and (ii) concurrently, with the second graphic indicator, the location-specific second service information for the second type of transport service; and in response to the input of the user along the at least one bidirectional path, (i) move the first graphic indicator of the first vehicle type along the at least one bidirectional path, (ii) replace the first graphic indicator of the first vehicle type with the second graphic indicator of the second vehicle type, and (iii) replace the location-specific first service information with the location-specific second service information.

11. The non-transitory computer-readable medium of claim 10, wherein at least one of the location-specific first service information or the location-specific second service information is further based on a size or capacity selection of the respective first or second vehicle type.

12. The non-transitory computer-readable medium of claim 10, wherein the location-specific first service information identifies pricing information that is specific to the first vehicle type, and the location-specific second service information identifies pricing that is specific to the second vehicle type.

13. The non-transitory computer-readable medium of claim 10, wherein the location-specific first service information includes location information for one or more providers of the first vehicle type and the location-specific second service information includes location information for one or more providers of the second vehicle type.

14. A computing device comprising:
one or more processors;
a display;
a memory that stores a set of instructions:
wherein the one or more processors execute the set of instructions stored in memory to:
determine a current location of the computing device based on location information obtained from the computing device;
provide, on the display, a multistate selection feature that is operative to display information about multiple types of services that are available through an on-demand service at the current location of the computing device, the multistate selection feature being responsive to an input of a user along at least one a-bidirectional path to transition amongst at least a first state that is associated with a first type of transport service of the multiple types of services, and a second state that is associated with a second type of transport service of the multiple types of services;
obtain location-specific service information based on the current location of the computing device, the location-specific service information including location-specific first service information for the first type of transport service, and location-specific second service information for the second type of transport service;
wherein providing the multistate selection feature includes:
when the multistate selection feature is in the first state, display (i) the multistate selection feature to include a first graphic indicator of a first vehicle type to represent the first type of transport service, and (ii) concurrently, with the first graphic indicator, the location-specific first service information;
when the multistate selection feature is in the second state, display (i) the multistate selection feature to include a second graphic indicator of a second vehicle type to represent the second type of transport service, and (ii) concurrently, with the second graphic indicator, the location-specific second service information for the second type of transport service; and in response to the input of the user along the at least one bidirectional path, (i) move the first graphic indicator of the first vehicle type along the at least one bidirectional path, (ii) replace the first graphic indicator of the first vehicle type with the second graphic indicator of the second vehicle type, and (iii) replace the location-specific first service information with the location-specific second service information.

15. The computing device of claim 14, wherein the set of instructions stored in the memory are provided from a network service that also transmits data for enabling the location-specific service information.

\* \* \* \* \*